(12) United States Patent
Suzuki et al.

(10) Patent No.: US 12,547,164 B2
(45) Date of Patent: Feb. 10, 2026

(54) ABNORMALITY DETECTION APPARATUS, COMPUTER-READABLE STORAGE MEDIUM, AND ABNORMALITY DETECTION METHOD

(71) Applicant: KABUSHIKI KAISHA YASKAWA DENKI, Fukuoka (JP)

(72) Inventors: Ryohei Suzuki, Tokyo (JP); Marino Kashiyama, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 11 days.

(21) Appl. No.: 17/714,997

(22) Filed: Apr. 6, 2022

(65) Prior Publication Data

US 2022/0342405 A1    Oct. 27, 2022

(30) Foreign Application Priority Data

Apr. 26, 2021 (JP) ................ 2021-074361

(51) Int. Cl.
*G05B 23/02* (2006.01)
(52) U.S. Cl.
CPC ....... *G05B 23/027* (2013.01); *G05B 23/0254* (2013.01)
(58) Field of Classification Search
None
See application file for complete search history.

(56) References Cited

U.S. PATENT DOCUMENTS

| | | | |
|---|---|---|---|
| 7,027,953 B2 * | 4/2006 | Klein | G01H 1/006 702/182 |
| 10,847,020 B2 | 11/2020 | Lee | |
| 11,226,607 B2 | 1/2022 | Shogaki | |
| 2020/0004616 A1 | 1/2020 | Natsumeda | |

(Continued)

FOREIGN PATENT DOCUMENTS

| | | |
|---|---|---|
| CN | 112639431 A | 4/2021 |
| JP | 2008076292 A | 4/2008 |

(Continued)

OTHER PUBLICATIONS

Schwabacher, Mark, Nikunj Oza, and Bryan Matthews. "Unsupervised anomaly detection for liquid-fueled rocket propulsion health monitoring." Journal of aerospace computing, information, and communication 6.7 (2009): 464-482. (Year: 2009).*

(Continued)

*Primary Examiner* — Carlos R Ortiz Rodriguez

(57) ABSTRACT

An abnormality detection apparatus is provided, comprising a target data generation unit configured to generate, based on operation-related data resulting from an operation of a movable apparatus, a plurality of target data that are temporally separated, and a detection processing execution unit configured to execute change detection processing on the plurality of target data. An abnormality detection method that is executed by a computer for detecting an abnormality in a movable apparatus is provided, the method comprising generating, based on operation-related data resulting from an operation of the movable apparatus, a plurality of target data that are temporally separated, and executing change detection processing on the plurality of target data.

21 Claims, 10 Drawing Sheets

(56) References Cited

U.S. PATENT DOCUMENTS

| | | | |
|---|---|---|---|
| 2021/0255613 A1 | 8/2021 | Shohei | |
| 2022/0042952 A1 | 2/2022 | Kuriyama | |

FOREIGN PATENT DOCUMENTS

| | | | |
|---|---|---|---|
| JP | 2015083731 A | 4/2015 | |
| JP | 6169473 B2 | 7/2017 | |
| JP | 2017204017 A | 11/2017 | |
| JP | 2019079452 A | 5/2019 | |
| JP | 2020520014 A | 7/2020 | |
| JP | 2021038946 A | 3/2021 | |
| WO | 2020234961 A1 | 11/2020 | |

OTHER PUBLICATIONS

Wang, Yue, Wei Dai, and Jianglin Xiao. "Detection for cutting tool wear based on convolution neural networks." 2018 12th International Conference on Reliability, Maintainability, and Safety (ICRMS). IEEE, 2018. (Year: 2018).*

Zhang, Shaohui, et al. "Deep learning with emerging new labels for fault diagnosis." IEEE Access 7 (2018): 6279-6287. (Year: 2018).*

Li, Xiao, et al. "Learning quasi-periodic robot motions from demonstration." Autonomous Robots 44.2 (2020): 251-266. (Year: 2020).*

Silva-Reyes, Anthony. Data-driven life prediction model for bearing failure. University of Puerto Rico, Mayaguez Campus. Diss. 2009. (Year: 2009).*

Li, Naipeng, et al. "An improved exponential model for predicting remaining useful life of rolling element bearings." IEEE Transactions on Industrial Electronics 62.12 (2015): 7762-7773. (Year: 2015).*

Ding, Yin, et al. "Detection of faults in rotating machinery using periodic time-frequency sparsity." Journal of Sound and Vibration 382 (2016): 357-378. (Year: 2016).*

Extended European Search Report for European Patent Application No. 22167157.1, issued by the European Patent Office on Sep. 26, 2022.

Office Action issued for counterpart Japanese Application No. 2021-074361, issued by the Japan Patent Office on Sep. 28, 2021 (drafted on Sep. 17, 2021).

Office Action issued for counterpart European Application No. 22167157.1, issued by the European Patent Office on Oct. 2, 2023 *Reference listed in the Office Action can be referred to the enclosed European Search Report made to the same application.

Office Action issued for counterpart Chinese Application 202210427651.3, issued by The State Intellectual Property Office of People's Republic of China on Dec. 22, 2025.

* cited by examiner

ABNORMALITY DETECTION APPARATUS, COMPUTER-READABLE STORAGE MEDIUM, AND ABNORMALITY DETECTION METHOD

The contents of the following Japanese patent application(s) are incorporated herein by reference:
NO. 2021-074361 filed in JP on Apr. 26, 2021

BACKGROUND

1. Technical Field

The present invention relates to an abnormality detection apparatus, a computer-readable storage medium, and an abnormality detection method.

2. Related Art

Patent document 1 describes an abnormality determination system for determining an abnormal operation of a motor-driven machine.

PRIOR ART DOCUMENTS

Patent Document

Patent document 1: Japanese Patent Application Publication No. 2019-079452

DESCRIPTION OF EXEMPLARY EMBODIMENTS

Hereinafter, the present invention will be described through embodiments of the invention, but the following embodiments do not limit the invention according to the claims. In addition, not all combination of the features described in the embodiments are necessary for the solution of the invention.

Figure 1:
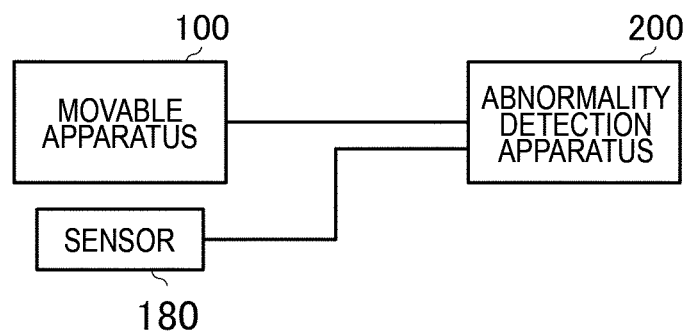
FIG. 1 schematically illustrates one example of a system 10.

FIG. 1 schematically illustrates one example of a system 10. The system 10 includes a movable apparatus 100 and an abnormality detection apparatus 200. The system 10 may include a sensor 180. The system 10 may not include the sensor 180.

The movable apparatus 100 may be any apparatus having a movable part. The movable apparatus 100 is, for example, industrial machinery. The movable apparatus 100 may include a motor for enabling the movement of the movable part. The movable apparatus 100 may include a control apparatus for controlling the motor. The control apparatus may be an inverter. The motor may be a servomotor, and the control apparatus may be a servomotor controller. Examples of the movable part include, but are not limited to, a ball screw, a robot, a robot arm, a belt driving apparatus, a conveyer, an air conditioner, a fan, and the like.

The movable apparatus 100 may be an apparatus for manufacturing a manufacture item. For example, the movable apparatus 100 manufactures a manufacture item by performing machining on a work, or assembling works. For example, the movable apparatus 100 includes a robot arm as the movable part, and performs any operation such as machining, assembling and the like on the work by the robot arm. The work may be a single part, a semi-product in which a plurality of parts are combined, or a product in which a plurality of parts are combined. Any item that has been machined by the movable apparatus 100 may apply as the manufacture item.

The abnormality detection apparatus 200 executes processing related to detection of an abnormality in the movable apparatus 100. The abnormality detection apparatus 200 may execute processing related to detection of an abnormality in the movable apparatus 100 to detect an abnormality in the movable apparatus 100. Detection of an abnormality in the movable apparatus 100 by the abnormality detection apparatus 200 is not essential, and the processing executed by the abnormality detection apparatus 200 may only be processing related to detection of an abnormality in the movable apparatus 100. The abnormality detection apparatus 200 may execute processing related to the detection of an abnormality in the movable apparatus 100 or detect an abnormality in the movable apparatus 100 based on operation-related data resulting from an operation of the movable apparatus 100.

The operation-related data is data resulting from an operation of a motor comprised in the movable apparatus 100, for example. The operation-related data is data resulting from an operation of a movable part comprised in the movable apparatus 100, for example.

The abnormality detection apparatus 200 may receive the operation-related data from the movable apparatus 100. The operation-related data may be a measurement value at the movable apparatus 100. The operation-related data is, for example, a measured current at the control apparatus of the movable apparatus 100. The operation-related data may be an instruction value at the movable apparatus 100. The operation-related data may be, for example, a current instruction in the control apparatus of the movable apparatus 100. Examples of the operation-related data include, but are not limited to, a torque, a q-axis current, a motor speed, motor location information, output voltage, power consumption, PN voltage and the like.

The abnormality detection apparatus 200 may receive the operation-related data of the movable apparatus 100 from the sensor 180. The sensor 180 is installed on the movable apparatus 100, and outputs operation-related data resulting from an operation of the movable apparatus 100. The sensor 180 is installed on the motor of the movable apparatus 100, for example. The sensor 180 is installed on the movable part of the movable apparatus 100, for example. Examples of the sensor 180 include, but are not limited to, a vibration sensor, a sound collecting sensor, an inner force sensor, an acceleration sensor, a strain sensor, a pressure sensor, a gyrosensor, a distance sensor, an image capture sensor, a temperature sensor, a humidity sensor, a light amount sensor, a viscosity sensor, a flow rate sensor, a light amount sensor, an odor sensor and the like.

The operation-related data may be data that are temporally in series. The operation-related data is, for example, a measurement value obtained by performing measurement at the movable apparatus 100 temporally in series. The operation-related data is, for example, instruction values that are temporally in series at the movable apparatus 100.

The operation-related data may be data that is not temporally in series. The operation-related data is, for example, a plurality of types of setting value inside the movable apparatus 100 obtained on a regular or irregular basis. The operation-related data is information used for feedback control that is obtained on a regular or irregular basis, for example. For example, in a case where the movable apparatus 100 includes an inverter or a servomotor, examples of information used for the feedback control include location information, speed information, current information and the like.

The operation-related data may be data indicating the inspection result obtained by inspecting the movable apparatus 100. The operation-related data is, for example, data indicating the inspection result obtained by executing a plurality of types of inspection on a regular or irregular basis. The plurality of types of inspection may be inspection on a plurality of regions of the movable apparatus 100. The plurality of types of inspection may be inspection for a plurality of items on the movable apparatus 100. Examples of the plurality of items include, but are not limited to, vibration, sound, acceleration, strain, pressure, temperature, humidity and the like, and in a case where the movable apparatus 100 is a robot or the like, starting torque, ripple and the like on each axis. However the plurality of items may be any item as long as it results in a numerical value. The inspection of the movable apparatus 100 is executed by the sensor 180, for example. The inspection of the movable apparatus 100 may be executed by an inspection apparatus for inspection.

The operation-related data may be data related to a manufacture item manufactured by the operation of the movable apparatus 100. The operation-related data is, for example, data indicating the inspection results of the plurality of types of inspection that is executed on a regular or irregular basis on the manufacture item that is continuously manufactured by the operation of the movable apparatus 100. The plurality of types of inspection may be inspection on a plurality of regions of the manufacture item. For example, in a case where the movable apparatus 100 manufactures the manufacture item by assembling a plurality of works, the plurality of types of inspection is for assembly errors or the like in each of the plurality of works. The plurality of types of inspection may be inspection of a plurality of items on the manufacture item. Examples of the plurality of items include, but are not limited to, vibration, sound, acceleration, strain, pressure, temperature, humidity and the like, and in a case where the manufacture item is a robot or the like, starting torque, ripple and the like on each axis. However the plurality of items may be any item as long as it results in a numerical value. The inspection of the manufacture item is executed by the sensor 180, for example. The inspection of the manufacture item may be executed by an inspection apparatus for inspection.

For example, methods for inspecting failure of a ball screw or a bearing in the motor currently include methods such as determining by hearing the sound by a person, or determining by sensor information of a vibration meter, a noise meter or the like. However, there are problems such as variation in evaluations by a person, or installation cost of a sensor. It is desirable to be able to provide a technology that is capable of detecting an abnormality only with internal data that can be obtained from a motor, an inverter and the like.

Internal data that can be obtained from a motor, an inverter and the like may have individual difference. In addition, a plurality of normal data can be obtained, but for failure data, in most situations, there are "less" or "no" failure data, and a plurality of failure modes also exist. Furthermore, there are periodic data such as reciprocating motion of an operation of the ball screw, and there are data that keep rotating at a constant speed such as in a case of an inverter of an air conditioner. In a case of a constant operation (for example, repeating of acceleration, constant speed, and speed reduction) like that of a ball screw, internal data presents periodicity. Therefore, it is possible to obtain similar waveforms by collecting data at a certain time interval, and thus, possible to extract features in which the waveform is disturbed by a failure resulting from aging. On the other hand, it may be difficult to extract features for data that is not periodic.

As a failure detection algorithm, although deep learning, which is a machine learning technique, can be considered, it may be difficult to perform learning with a deep learning model in a case where there are individual differences in the data or where there is little or no failure data.

In a case where the operation-related data is data that is not periodic, the abnormality detection apparatus 200 according to the present embodiment may include a function of converting the operation-related data into periodic data. In addition, the abnormality detection apparatus 200 may include a function of executing an algorithm for calculating a degree of failure of the movable apparatus 100 as the degree of abnormality.

The abnormality detection apparatus 200 and the movable apparatus 100 may be directly coupled. For example, the abnormality detection apparatus 200 and the movable apparatus 100 may be connected in a wired manner. For example, the abnormality detection apparatus 200 and the movable apparatus 100 are connected in a wireless manner. Examples of the wireless communication method used by the abnormality detection apparatus 200 and the movable apparatus 100 include, but are not limited to, Bluetooth (registered trademark), ZigBee (registered trademark), Wi-Fi (registered trademark) (Wireless Fidelity), EnOcean (registered trademark), Wi-SUN (registered trademark) and the like. Similarly, the abnormality detection apparatus 200 and the sensor 180 may be directly coupled.

The movable apparatus 100 and the abnormality detection apparatus 200 may be connected via a network. Examples of the network used by the movable apparatus 100 and the abnormality detection apparatus 200 include LAN (Local Area Network), WAN (Wide Area Network), and the Internet. Similarly, the abnormality detection apparatus 200 and the sensor 180 may be connected via a network.

Figure 2:
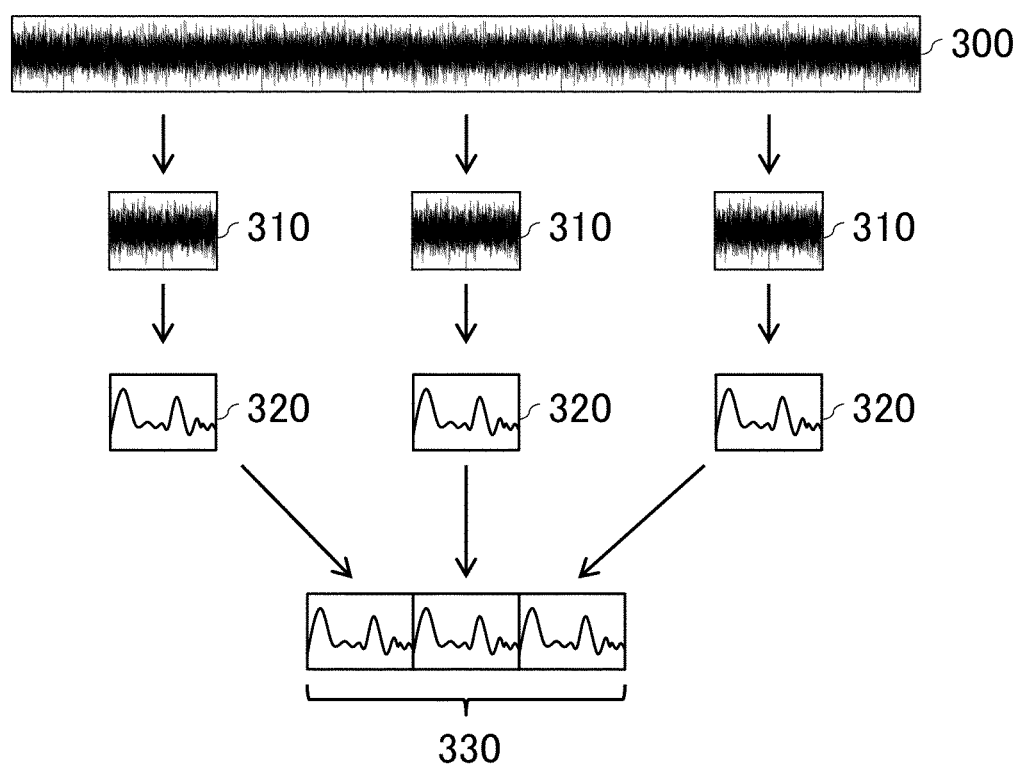
FIG. 2 is an illustration for describing a processing content by an abnormality detection apparatus 200.

FIG. 2 is an illustration for describing the processing content by the abnormality detection apparatus 200. Here, a case where the operation-related data 300 is data that is not periodic that is temporally in series is described.

The abnormality detection apparatus 200 may perform a conversion processing on portions 310 of the operation-related data 300 that are temporally separated to generate a plurality of target data 320 that are temporally separated. The abnormality detection apparatus 200 converts, by FFT (Fast Fourier Transform), for example, the portions 310 of the operation-related data 300 that are temporally separated into a plurality of target data 320 that are temporally separated.

The interval between the portions of the operation-related data 300 that are temporally separated may be determined according to the type or the like of the operation-related data 300, for example Although a case where three pieces of target data 320 are generated is illustrated in FIG. 2, the number of the target data 320 is not limited to this, and may be four or more.

The abnormality detection apparatus 200 may generate linked data 330 obtained by linking the plurality of target data 320. In this manner, a periodic waveform can be obtained.

The abnormality detection apparatus 200 may execute change detection processing on the linked data 330. During a period in which the movable apparatus 100 is normally operating, since there is no change or little change to the operation-related data 300, the change in the linked data 330 is not detected. On the other hand, in a case where an abnormality is occurring in the operation of the movable apparatus 100, the operation-related data 300 is changed, and the change in the linked data 330 is detected. In this way, according to the abnormality detection apparatus 200, the detection accuracy of an abnormality for data that is not periodic can be improved.

It should be noted that, although a case in which a conversion processing is performed on the portions 310 of the operation-related data 300 that are temporally separated is illustrated in FIG. 2, it is not limited thereto. The abnormality detection apparatus 200 may generate linked data obtained by linking the portions 310 of the operation-related data 300 that are temporally separated by the type of the operation-related data 300 or the features of the operation-related data 300.

Figure 3:
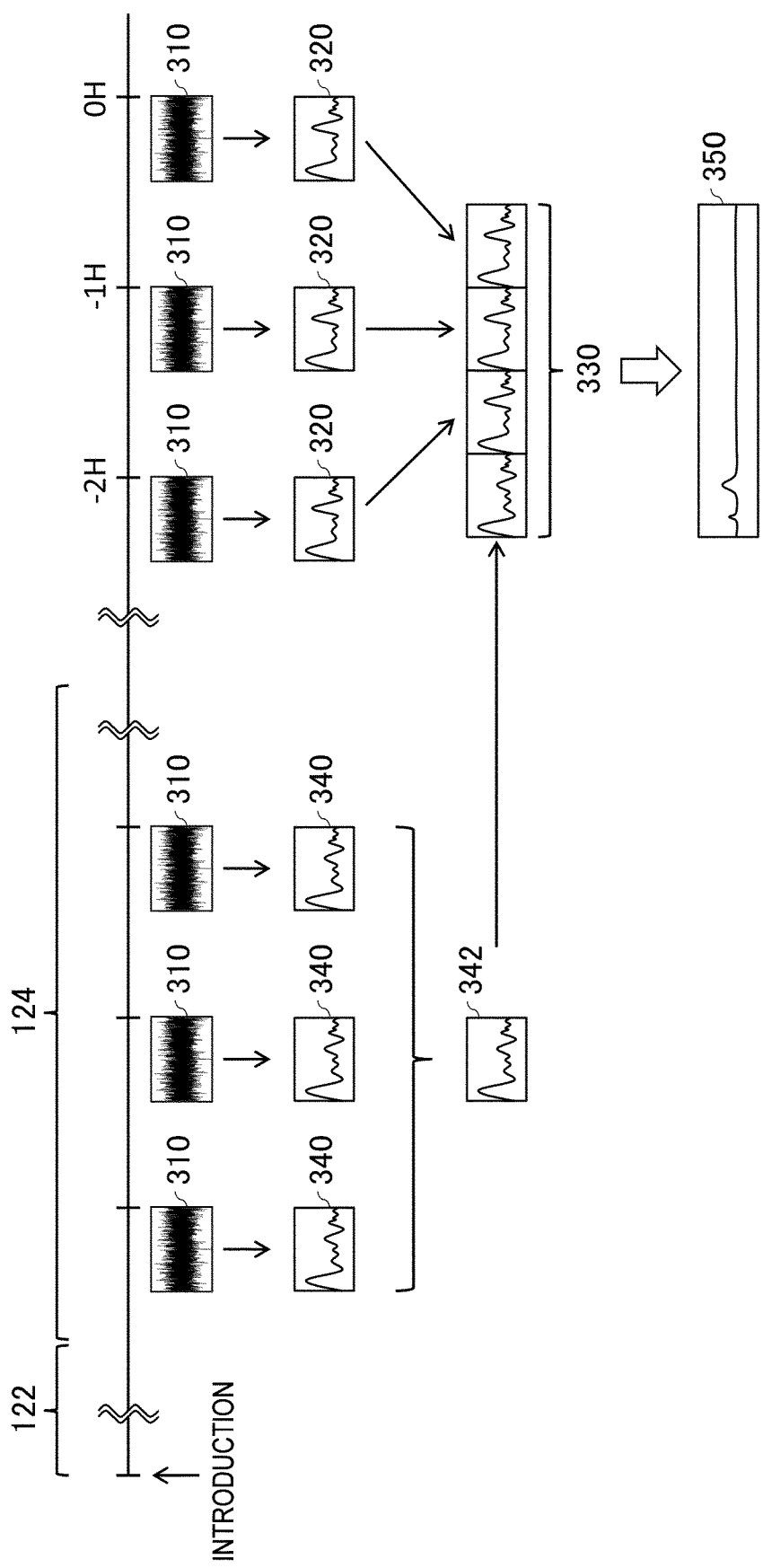
FIG. 3 is an illustration for describing a processing content by the abnormality detection apparatus 200.

FIG. 3 is an illustration for describing a processing content by an abnormality detection apparatus 200. Here, a case where the operation-related data 300 is data that is not periodic that is temporally in series is described.

The abnormality detection apparatus 200 generates the plurality of intermediate data 340 by performing conversion processing on the portions 310 of the operation-related data during a normal operation period 124, for example. The normal operation period 124 may be a period during which the probability of the movable apparatus 100 operating normally is higher. The normal operation period 124 may be the period after the operation of the movable apparatus 100 is stabilized, after the movable apparatus 100 has been introduced and after the accumulated operation period of the movable apparatus 100 becomes longer than the predetermine period 122.

The abnormality detection apparatus 200 generates the reference data 342 by performing an averaging processing on the plurality of intermediate data 340. The abnormality detection apparatus 200 stores the reference data 342 that is generated.

The abnormality detection apparatus 200 generates the plurality of target data 320 that are temporally separated by performing the conversion processing on the portions 310 of the operation-related data at the current time of the timing at which the abnormality detection is executed, and on the portions 310 of the operation-related data at a plurality of past times. The abnormality detection apparatus 200 may perform the same conversion processing as the conversion processing used when generating the reference data, on the portions 310 of the operation-related data. Although a case where three pieces of target data 320 are generated is illustrated in FIG. 3, the number of the target data 320 is not limited to this, and may be four or more.

The abnormality detection apparatus 200 links the plurality of target data 320 and the reference data 342 to generate the linked data 330. The abnormality detection apparatus 200 executes the change detection processing on the linked data 330 to obtain the change detection result 350.

In a case where the change detection processing is executed by linking only the plurality of target data 320, since only the most recent change is considered, it is difficult to comprehend a change in the entire trend. The operation-related data often change gradually along with the aging degradation or the like of the movable apparatus 100. For example, degradation of bearings, sliding parts and the like progresses by continuous use thereof, with gradually increasing vibration or the like, which results in a failure. However, in a case where only the plurality of target data 320 is the target, it may be difficult to detect such changes. Although it may be possible to detect such changes by increasing the amount of time to go back from the current time and increasing the number of target data 320, the processing load increases as the number of target data 320 increases. Contrarily, by further linking the reference data 342 generated from the portions 310 of the operation-related data during a normal operation period 124, it becomes possible to comprehend how far the recent data is from the reference data 342.

The abnormality detection apparatus 200 may identify one numerical value (may be described as a degree of abnormality) by calculating the feature amount from the waveform of the change detection result 350. The abnormality detection apparatus 200 calculates the maximum value of the waveform of the change detection result 350, for example. The abnormality detection apparatus 200 calculates the average value of the waveform of the change detection result 350, for example. The abnormality detection apparatus 200 calculates the standard deviation of the waveform of the change detection result 350, for example.

The abnormality detection apparatus 200 may execute the processing disclosed above on a regular basis to identify the degree of abnormality on a regular basis. For example, the abnormality detection apparatus 200 generate a plurality of target data 320 at each hour by using a moving window, generates the linked data 330 by linking the reference data 342, and obtains the change detection result 350 to identify the degree of abnormality. The abnormality detection apparatus 200 may then estimate the failure timing of the movable apparatus 100 based on the transition in the degree of abnormality.

As can be seen in FIGS. 2 and 3, each of the plurality of target data 320 has a wave form, a first end, and a second end. The plurality of target data 320 are linked in a series such that each of the plurality of target data 320 in the series, except for a first one of the plurality of target data in the series, immediately follows another of the plurality of target data 320 in the series in sequential order, to provide at least a portion of the linked data 330. Each of the plurality of target data 320 in the series, except for the first one of the plurality of target data in the series, is appended to a preceding one of the plurality of target data 320 in the series in end-to-end fashion such that the first end of each of the plurality of target data 320 in the series, except for the first one of the plurality of target data in the series, is appended to the second end of the preceding one of the plurality of target data 320 in the series.

Figure 4:
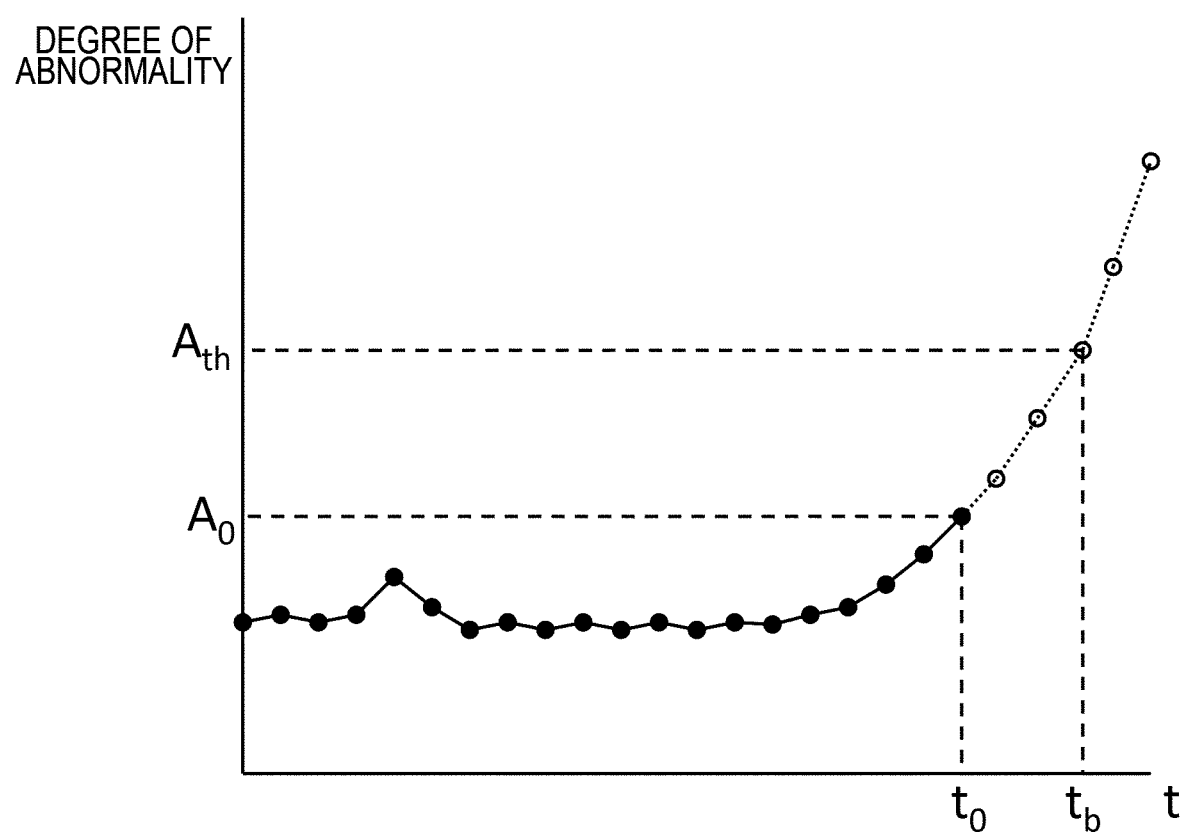
FIG. 4 schematically illustrates one example of an abnormality degree transition graph 280.

FIG. 4 schematically illustrates one example of an abnormality degree transition graph 280. $A_0$ indicates the degree of abnormality at the current time $t_0$. The abnormality detection apparatus 200 may predict a change in the degree of abnormality from the time series change in the degree of abnormality. The abnormality detection apparatus 200 predicts the change in the degree of abnormality by applying a preregistered exponential model to the time series change in the degree of abnormality, for example.

The abnormality detection apparatus 200 may estimate the failure timing of the movable apparatus 100 based on the prediction result of the change in the degree of abnormality. The abnormality detection apparatus 200 identifies, as the estimated failure timing, time $t_b$ at which the predicted degree of abnormality exceeds the threshold value $A_{th}$ of the preregistered degree of abnormality, for example. The abnormality detection apparatus 200 notifies an administrator or the like of the movable apparatus 100 of the identified estimated failure timing, for example. In this manner, a float time for taking measures for the failure can be provided to the administrator or the like of the movable apparatus 100.

Figure 5:
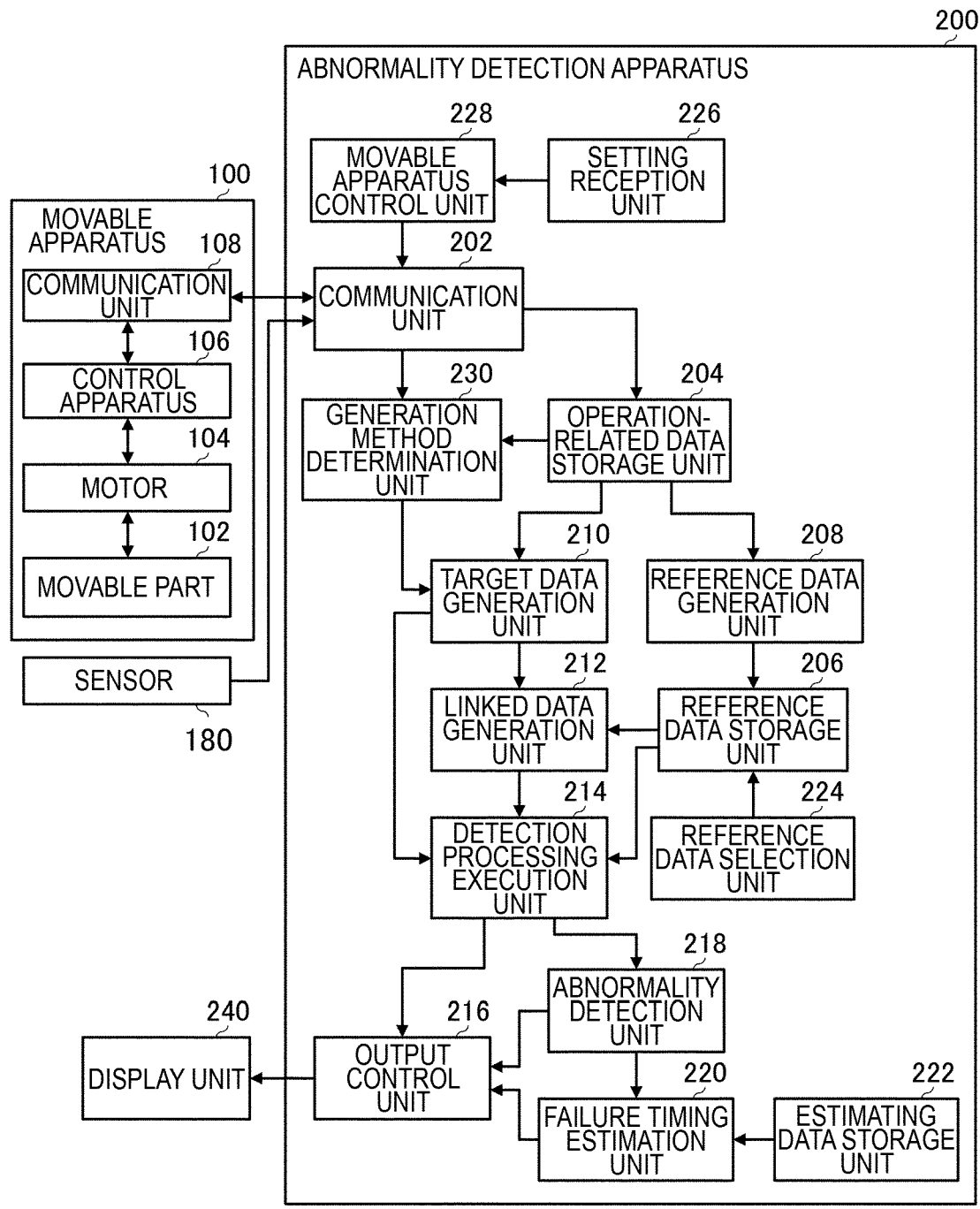
FIG. 5 schematically illustrates one example of a functional configuration of the abnormality detection apparatus 200.

FIG. 5 schematically illustrates one example of a functional configuration of a system 10. The movable apparatus 100 illustrated in FIG. 5 includes a movable part 102, a motor 104, a control apparatus 106, and a communication unit 108. The movable apparatus 100 may include a plurality of movable parts 102 and motors 104. Here, a case where the control apparatus 106 is an inverter is mainly taken as an example for the description. Although a case where a sensor 180 is installed in the movable apparatus 100 is illustrated in FIG. 5, the sensor 180 may not be installed.

The control apparatus 106 controls the motor 104, as well as transmits the operation-related data to the abnormality detection apparatus 200 via the communication unit 108. Here, a case where the control apparatus 106 transmits, to the movable apparatus 100, at least any of the torque, the q-axis current, the motor speed, and the output current as the operation-related data is mainly taken as an example for the description.

The sensor 180 executes measurements on the movable apparatus 100, and transmits the operation-related data of the movable apparatus 100 to the movable apparatus 100. Here, a case where the sensor 180 is a vibration sensor is mainly taken as an example for the description.

The abnormality detection apparatus 200 illustrated in FIG. 5 includes a communication unit 202, an operation-related data storage unit 204, a reference data storage unit 206, a reference data generation unit 208, a target data generation unit 210, a linked data generation unit 212, a detection processing execution unit 214, an output control unit 216, an abnormality detection unit 218, a failure timing estimation unit 220, an estimating data storage unit 222, a reference data selection unit 224, a setting reception unit 226, a movable apparatus control unit 228, and a generation method determination unit 230. It should be noted that, it is not necessarily essential for the abnormality detection apparatus 200 to include all of these components. The abnormality detection apparatus 200 may have a display unit 240 connected thereto. The abnormality detection apparatus 200 may include a display unit 240.

The communication unit 202 communicates with the communication unit 108. The communication unit 202 receives the operation-related data from the communication unit 108, for example. In addition, the communication unit 202 may receive the operation-related data from the sensor 180. The operation-related data storage unit 204 stores the operation-related data received by the communication unit 202.

The reference data storage unit 206 stores the reference data. The reference data storage unit 206 may store the reference data in advance before the abnormality detection is executed. The reference data storage unit 206 may store the reference data generated by the reference data generation unit 208.

Generating the Reference Data

The reference data generation unit 208 generates the reference data, and causes the same to be stored in the reference data storage unit 206. The reference data generation unit 208 may generate the reference data based on a portion of the operation-related data that is stored in the operation-related data storage unit 204.

The movable apparatus 100 can handle any target object, but there may be cases where it is unknown in advance what kind of target object is to be handled by the movable apparatus 100. In addition, there may be cases where the environment in which the movable apparatus 100 is installed is unknown in advance. With the abnormality detection apparatus 200 according to the present embodiment, the reference data can be generated based on the operation-related data when the movable apparatus 100 is installed in an actual usage environment and is handling an object to be actually handled, for example. In this manner, it can contribute to improvement in the abnormality detection accuracy.

The reference data generation unit 208 generate the reference data based on the portion of the operation-related data resulting from the operation of the movable apparatus 100 after the movable apparatus 100 is introduced, and after the accumulated operation period of the movable apparatus 100 becomes longer than the predetermined period, for example. The reference data generation unit 208 generates the reference data based on the portion of the operation-related data resulting from the operation of the movable apparatus 100 after the movable apparatus 100 is introduced, and after the accumulated number of times of operation of the movable apparatus 100 becomes larger than the predetermined number of times, for example. In this manner, the abnormality detection accuracy can be prevented from being reduced due to generation of the reference data based on the operation-related data obtained while the operation of the movable apparatus 100 is not stable immediately after the movable apparatus 100 is introduced, for example.

The reference data generation unit 208 generates the reference data based on the portion of the operation-related data resulting from the operation of the movable apparatus 100 obtained during the normal operation period after the operation of the movable apparatus 100 becomes stable, for example, after the movable apparatus 100 is introduced and after the accumulated operation period of the movable apparatus 100 becomes longer than the predetermined period. The reference data generation unit 208 generates the reference data based on the portion of the operation-related data resulting from the operation of the movable apparatus 100 obtained during the normal operation period after the operation of the movable apparatus 100 becomes stable, for example, after the movable apparatus 100 is introduced and the accumulated number of times of operation of the movable apparatus 100 becomes larger than the predetermined number of times. The normal operation period may be a period during which the probability of the movable apparatus 100 operating normally is higher. For example, the normal operation period is the period of time during which it is confirmed that the movable apparatus 100 is operating normally. For example, the normal operation period is a period set by the administrator or the like of the movable apparatus 100. For example, the normal operation period is a period during which no significant difference occurs in the operation-related data. By generating the reference data based on the portion of the operation-related data obtained during the normal operation period, it may become possible to detect the change in the movable apparatus 100 in a normal state.

Generating the Reference Data Using a Portion of the Operation-Related Data

The reference data generation unit 208 may generate the reference data based on a portion of the operation-related data. For example, the reference data generation unit 208 generates the reference data by performing conversion processing on a portion of the operation-related data.

The reference data generation unit 208 may generate the reference data obtained by converting the portion of the operation-related data into a waveform on an axis that is different from time. For example, the reference data generation unit 208 generates the reference data obtained by converting the portion of the operation-related data into a waveform on a frequency axis. As a specific example, the reference data generation unit 208 may generate the reference data by executing FFT on the portion of the operation-related data. For example, the reference data generation unit 208 generates the reference data obtained by converting the portion of the operation-related data into a waveform formed by a plurality of modelling parameters. As a specific example, the reference data generation unit 208 models the portion of the operation-related data with an AR (Auto Regressive) model to identify a plurality of factors, and generates the waveform represented by the plurality of factors.

It should be noted that, the reference data generation unit 208 may use the portion of the operation-related data as the reference data without performing conversion processing on the portion of the operation-related data. Generating the reference data may include using the portion of the operation-related data as the reference data in this way. For example, the reference data generation unit 208 uses the portion of the operation-related data as the reference data in a case where the type of the operation of the movable apparatus 100 is a type that is preregistered as those on which the conversion processing is not to be performed, or where the operation-related data indicates a periodic feature. In addition, reference data generation unit 208 uses the portion of the operation-related data as the reference data in a case where the operation-related data is data that is not temporally in series, for example. As a specific example, the reference data generation unit 208 uses the portion of the operation-related data as the reference data in a case where the operation-related data is a plurality of types of setting values inside the movable apparatus 100, information used for feedback control, data indicating the inspection results of the plurality of types of inspections, the data related to the manufacture item by the movable apparatus 100, or the like, that is obtained on a regular or irregular basis.

Generating the Reference Data Using a Plurality of Portions of the Operation-Related Data The reference data generation unit 208 may generate the reference data by performing an averaging processing on a plurality of intermediate data generated from a plurality of portions of the operation-related data. For example, the reference data generation unit 208 may generate a plurality of intermediate data by performing a conversion processing on the plurality of portions of the operation-related data and generate the reference data by performing the averaging processing on the plurality of intermediate data.

The reference data generation unit 208 may generate the plurality of intermediate data obtained by converting the plurality of portions of the operation-related data into a waveform on an axis that is different from time, and generate the reference data by performing the averaging processing on the plurality of intermediate data. For example, the reference data generation unit 208 generates the plurality of intermediate data obtained by converting the plurality of portions of the operation-related data into a waveform on a frequency axis. As a specific example, the reference data generation unit 208 generates the plurality of intermediate data by executing FFT on the plurality of portions of the operation-related data. For example, the reference data generation unit 208 generates a plurality of intermediate data obtained by converting the plurality of portions of the operation-related data into a waveform formed by a plurality of modelling parameters. As a specific example, the reference data generation unit 208 models the plurality of portions of the operation-related data with an AR (Auto Regressive) model to identify a plurality of factors, and generates a waveform represented by the plurality of factors.

It should be noted that, the reference data generation unit 208 may generate the reference data by performing the conversion processing after performing the averaging processing on the plurality of portions of the operation-related data.

In addition, the reference data generation unit 208 may generate the reference data by performing the averaging processing on the plurality of portions of the operation-related data without performing the conversion processing on the plurality of portions of the operation-related data. For example, the reference data generation unit 208 generates the reference data by performing the averaging processing on the plurality of portions of the operation-related data in a case where the type of the operation of the movable apparatus 100 is a type that is preregistered as those on which the conversion processing is not to be performed, or where the operation-related data presents a periodic feature. In addition, for example, the reference data generation unit 208 generates the reference data by performing the averaging processing on the plurality of portions of the operation-related data in a case where the operation-related data is data that is not temporally in series.

In a case where the reference data is generated by using only a portion of the operation-related data, when a sudden disturbance of a waveform occurs in that portion, the change detection accuracy may be reduced. However, by using a plurality of portions of the operation-related data, such reduction in the accuracy can be prevented.

Generating the Target Data

The target data generation unit 210 generates a plurality of target data that are temporally separated based on the operation-related data stored in the operation-related data storage unit 204. The target data generation unit 210 may generate, based on the operation-related data, the plurality of target data each including a plurality of values and being temporally separated from each other. The target data generation unit 210 may generate the plurality of target data that are temporally separated based on a plurality of portions of the operation-related data.

The target data generation unit 210 may generate the plurality of target data by performing the conversion processing on the plurality of portions of the operation-related data. The target data generation unit 210 may generate the plurality of target data by performing, on the plurality of portions of the operation-related data, the same conversion processing as the conversion processing used when the reference data generation unit 208 generated the reference data.

For example, the target data generation unit 210 generates the plurality of target data obtained by converting the plurality of portions of the operation-related data into a waveform on an axis that is different from the time. The target data generation unit 210 may generate the plurality of target data obtained by converting the plurality of portions of the operation-related data into a waveform on a frequency axis. As a specific example, the target data generation unit 210 generates the plurality of target data by executing FFT on the plurality of portions of the operation-related data. The target data generation unit 210 may generate the plurality of target data obtained by converting the plurality of portions of the operation-related data into a waveform formed by a plurality of modelling parameters. As a specific example, the target data generation unit 210 models the plurality of portions of the operation-related data with an AR (Auto Regressive) model to identify a plurality of factors, and generates a waveform represented by the plurality of factors.

It should be noted that, the target data generation unit 210 may use the plurality of portions of the operation-related data as the plurality of target data without performing the conversion processing on the operation-related data. Generating the plurality of target data may include using the plurality of portions of the operation-related data as the plurality of target data in this way. For example, the target data generation unit 210 uses the plurality of portions of the operation-related data as the plurality of target data in a case where the type of the operation of the movable apparatus 100 is a type that is preregistered as those on which the conversion processing is not to be performed, or where the operation-related data presents a periodic feature. In addition, for example, the target data generation unit 210 uses the plurality of portions of the operation-related data as the plurality of target data in a case where the operation-related data is data that is not temporally in series. As a specific example, the target data generation unit 210 uses the plurality of portions of the operation-related data as the plurality of target data in a case where the operation-related data is a plurality of types of setting values inside the movable apparatus 100, information used for feedback control, data indicating the results of the plurality of types of inspections, the data related to the manufacture item by the movable apparatus 100, or the like, that is obtained on a regular or irregular basis.

Generating the Linked Data

The linked data generation unit 212 generates linked data obtained by linking the plurality of target data generated by the target data generation unit 210, for example. The linked data generation unit 212 may generate the linked data by linking the plurality of target data generated by the target data generation unit 210 with the reference data stored in the reference data storage unit 206 included therein.

Change Detection Processing

The detection processing execution unit 214 may execute a change detection processing on the linked data generated by the linked data generation unit 212. The detection processing execution unit 214 may execute the change detection processing on a plurality of target data generated by the target data generation unit 210. The detection processing execution unit 214 may execute the change detection processing assuming that the plurality of target data is in series. The detection processing execution unit 214 may execute the change detection processing on the plurality of target data with the reference data stored in the reference data storage unit 206 included in the plurality of target data generated by the target data generation unit 210. The detection processing execution unit 214 may execute the change detection processing assuming that the reference data and the plurality of target data are in series.

The detection processing execution unit 214 may execute the change detection processing with said reference data included in the plurality of target data generated by the target data generation unit 210 based on a portion of the operation-related data that is later than the portion used to generate the reference data. The detection processing execution unit 214 may execute the change detection processing with the reference data generated based on the portion of the operation-related data during a normal operation period 124 included in the plurality of target data generated by the target data generation unit 210 based on the operation-related data during a period that is later than the normal operation period 124.

The detection processing execution unit 214 may execute the change detection processing using any known algorithm. The detection processing execution unit 214 executes the change detection processing using matrix profiling, for example. The detection processing execution unit 214 executes the change detection processing using an autoregressive model, for example. The detection processing execution unit 214 executes the change detection processing using a state space model, for example. The detection processing execution unit 214 executes the change detection processing using a K-nearest neighbors algorithm, for example.

Continuous Abnormality Detection

The target data generation unit 210 may update at least one target data of the plurality of target data for the operation-related data to be updated. The detection processing execution unit 214 may execute the change detection processing of the plurality of updated target data each time the update is performed.

For example, at N o'clock, the target data generation unit 210 generates target data corresponding to N o'clock, target data corresponding to N−1 o'clock, and target data corresponding to N−2 o'clock, and the linked data generation unit 212 generates linked data obtained by linking said three target data and reference data. At N+1 o'clock, the target data generation unit 210 updates the target data corresponding to N−2 o'clock to the target data corresponding to N+1 o'clock, and the linked data generation unit 212 generates linked data obtained by linking the target data corresponding to N−1 o'clock, the target data corresponding to N o'clock, the target data corresponding to N+1 o'clock, and the reference data. At N+2 o'clock, the target data generation unit 210 updates the target data corresponding to N−1 o'clock to target data corresponding to N+2 o'clock, and the linked data generation unit 212 generate linked data obtained by linking the target data corresponding to N o'clock, the target data corresponding to N+1 o'clock, the target data corresponding to N+2 o'clock, and the reference data. The detection processing execution unit 214 executes the change detection processing on the generated linked data each time said update is performed.

The output control unit 216 controls the output of the output data generated based on the processing result by the detection processing execution unit 214. The output control unit 216 causes the generated output data to be displayed on the display unit 240, for example. The output control unit 216 may transmit the output data to other apparatus in order to case the generated output data to be displayed on the other apparatus.

The output control unit 216 causes notification data for notifying the change detection processing result to be displayed on the display unit 240 each time the change detection processing is executed by the detection processing execution unit 214, for example. In this manner, the time series change in the change detection can be comprehended by a viewer.

Abnormality Detection

The abnormality detection unit 218 detects an abnormality in the movable apparatus 100 based on a temporal change in the processing result of the change detection processing by the detection processing execution unit 214. The abnormality detection unit 218 determines the degree of abnormality based on the processing result of each change detection processing, for example. The abnormality detection unit 218 uses the maximum value of the waveform in the processing result of the change detection processing as the degree of abnormality, for example. The abnormality detection unit 218 uses the average value of the waveform in the processing result of the change detection processing as the degree of abnormality, for example. The abnormality detection unit 218 uses the standard deviation of the waveform in the processing result of the change detection processing as the degree of abnormality, for example.

The abnormality detection unit 218 then detects the abnormality in the movable apparatus 100 based on the time series change in the degree of abnormality. The abnormality detection unit 218 executes, for example, an outlier detection on a waveform indicting a time series change in the degree of abnormality, and determines that some abnormality is occurring in the movable apparatus 100 when an outlier is detected. In addition, the abnormality detection unit 218 executes, for example, an abnormality region detection on a waveform indicting a time series change in the degree of abnormality, and determines that some abnormality is occurring in the movable apparatus 100 when an abnormality region is detected. In addition, the abnormality detection unit 218 executes, for example, a change point detection on the waveform indicating the time series change in the degree of abnormality, and determines that some abnormality is occurring in the movable apparatus 100 when a change point is detected.

The output control unit 216 controls the output of the notification data for notifying that there is a possibility of an abnormality occurring in the movable apparatus 100 in a case where an abnormality in the movable apparatus 100 is detected by the abnormality detection unit 218. The output control unit 216 causes the notification data to be displayed on the display unit 240, for example Failure Timing Estimation The failure timing estimation unit 220 estimates the failure timing of the movable apparatus 100 based on the time series change in the degree of abnormality determined by the abnormality detection unit 218. The failure timing estimation unit 220 predicts the change in the degree of abnormality by applying a preregistered exponential model to the transition in the degree of abnormality in a case where an exponential change is indicated by the time series change in the degree of abnormality, for example. The failure timing estimation unit 220 may estimate the failure timing of the movable apparatus 100 based on the prediction result of the change in the degree of abnormality. The failure timing estimation unit 220 identifies, as the degree of abnormality, the timing at which the predicted degree of abnormality exceeds a preregistered threshold of the estimated failure timing, for example.

The output control unit 216 causes the notification data for notifying the failure timing estimated by the failure timing estimation unit 220 to be output. The output control unit 216 causes the notification data to be displayed on the display unit 240, for example. In addition, the output control unit 216 causes warning data to be output at a time point that is earlier, by a predetermined period, than the failure timing estimated by the failure timing estimation unit 220. The output control unit 216 causes the warning data to be displayed on the display unit 240, for example. In this manner, grace period for handling the failure can be provided to the administrator the movable apparatus 100 or the like.

Failure Timing Estimation Using Failure Data of Movable Apparatuses of the Same Type The estimating data storage unit 222 stores the estimation data used by the failure timing estimation unit 220 to estimate the failure timing. The estimation data may include the time series change in the degree of abnormality in other movable apparatuses of the same type as the movable apparatus 100 and the failure timing of said other movable apparatuses. The estimating data storage unit 222 may store the estimation data generated by other apparatuses. The estimating data storage unit 222 may store the estimation data generated by the failure timing estimation unit 220.

The failure timing estimation unit 220 receives, from the other movable apparatus that has failed, which is of a same type as the movable apparatus 100, data indicating the time series change in the degree of abnormality and the timing of the failure, for example. The failure timing estimation unit 220 may generate the estimation data including the time series change in the degree of abnormality and the timing of the failure by using the data received from the plurality of other movable apparatuses, and store the same in the estimating data storage unit 222.

The failure timing estimation unit 220 may estimate the failure timing of the movable apparatus 100 by using the estimation data stored in the estimating data storage unit 222. The failure timing estimation unit 220 predicts the change in the degree of abnormality by applying the time series change in the degree of abnormality included in the estimation data to the time series change in the degree of abnormality identified by the abnormality detection unit 218. The failure timing estimation unit 220 then identifies the estimated failure timing of the movable apparatus 100 with the timing of the failure included in the estimation data. In this way, by utilizing the data when a failure occurred in the movable apparatus that is of a same type as the movable apparatus 100, the estimation accuracy of the failure timing can be improved.

Plurality of Types of Reference Data

The reference data storage unit 206 may store a plurality of types of reference data. For example, the reference data storage unit 206 stores the reference data for each operating mode of the movable apparatus 100.

The reference data selection unit 224 selects one piece of reference data from the plurality of types of reference data stored in the reference data storage unit 206. For example, the reference data selection unit 224 selects the reference data according to the operating mode of the movable apparatus 100. The reference data selection unit 224 may select the reference data corresponding to the operating mode of the movable apparatus 100, from the reference data for each operating mode of the movable apparatus 100 stored in the reference data storage unit 206.

The detection processing execution unit 214 may include the reference data selected by the reference data selection unit 224 in the plurality of target data generated by the target data generation unit 210, and execute a change detection processing on said plurality of target data. The linked data generation unit 212 may generate linked data obtained by linking the reference data selected by the reference data selection unit 224 and the plurality of target data generated by the target data generation unit 210.

In a case where the operating mode of the movable apparatus 100 is changed, the tendency of the operation-related data is likely to change. Therefore, if reference data generated under a different operating mode is used, there is a possibility that the accuracy of change detection is reduced. To the contrary, the reference data generation unit 208 may generate the reference data for each of the plurality of operating modes. When the movable apparatus 100 is set to each of the plurality of operating modes, the reference data generation unit 208 may generate the reference data based on the received operation-related data and store the same in the reference data storage unit 206. By using the reference data according to the operating mode of the movable apparatus 100, the accuracy of abnormality detection can be improved compared to a case where the reference data generated under a different operating mode is used.

The operating mode may be a mode for each operation content. The operating mode may be a mode for each operation target. For example, in a case where the movable part 102 is a robot arm, the operating mode is a mode for each target handled by the robot arm. For example, in a case where the movable part 102 is a conveyor, the operating mode is a mode for each target conveyed by the conveyor. The operating mode may be a mode for each operation environment. For example, the operating mode may be a mode for each location at which the movable apparatus 100 is installed.

Abnormality Detection Mode

The setting reception unit 226 receives a setting of the abnormality detection mode. The setting reception unit 226 may receive the setting of the abnormality detection mode by the administrator or the like of the movable apparatus 100. The setting reception unit 226 receives the setting of the abnormality detection mode via an input device included in the abnormality detection apparatus 200, for example.

The reference data generation unit 208 may generate the reference data based on a portion of the operation-related data resulting from an operation by the movable apparatus 100 in accordance with a first operation pattern for abnormality detection, and store the same in the reference data storage unit 206. The first operation pattern is a behavioral pattern determined by the administrator or the like of the movable apparatus 100 as a behavioral pattern that is easy to detect abnormality, for example. The first operation pattern may be a behavioral pattern mainly executed by the movable apparatus 100.

In a case where the setting reception unit 226 receives a setting of the abnormality detection mode, the movable apparatus control unit 228 causes the movable apparatus 100 to execute a second operation pattern that is identical or similar to the first operation pattern. The movable apparatus control unit 228 may cause the movable apparatus 100 to execute the second operation pattern by transmitting an instruction to execute the second operation pattern to the movable apparatus 100 via the communication unit 202. Being similar to the first operation pattern means, for example, that only a portion of the second operation pattern is different from the first operation pattern.

The detection processing execution unit 214 executes the change detection processing with the reference data generated based on the portion of the operation-related data resulting from an operation by the movable apparatus 100 in accordance with the first operation pattern included in the plurality of target data generated based on the operation-related data while an operation in accordance with the second operation pattern is executed by the movable apparatus 100. By introducing the abnormality detection mode, the movable apparatus 100 can be caused to execute a behavioral pattern that is identical or similar to that when the reference data is generated to perform abnormality detection, which can contribute to the improvement of the accuracy of the abnormality detection.

Selection of Target Data Generation Method

The generation method determination unit 230 determines the generation method for generating a plurality of target data from the operation-related data. The generation method determination unit 230 determines the generation method for generating the plurality of target data from the operation-related data, based on the type of operation of the target in the operation-related data, for example.

The generation method determination unit 230 identifies, for example, the type of the operation of the target in the operation-related data to be received from the movable apparatus 100 or the sensor 180 at the timing at which the target movable apparatus 100 on which the abnormality detection is to be performed is decided. The generation method determination unit 230 identified the type of the operation by receiving an input by an administrator or the like of the movable apparatus 100, for example.

For example, the administrator or the like of the movable apparatus 100 designates the type of the operation of the target in the operation-related data to be input to the abnormality detection apparatus 200 for the abnormality detection. In a case where the movable part 102 of the movable apparatus 100 is a conveyor, for example, there may be a large mechanical operation like an operation of a conveyor, an operation of individual elements like a bearing of the motor 104, and an operation that can be measured by the sensor 180 like vibration of the conveyor. In a case where the movable part 102 of the movable apparatus 100 is a robot arm, for example, there may be a large mechanical operation like an operation of the entire arm, an operation of individual elements like a bearing of the motor 104, and an operation that can be measured by the sensor 180 like vibration of the robot arm.

In a case where a large mechanical operation is identified, for example, the generation method determination unit 230 selects a generation method (may be described as the first generation method) of cropping a plurality of target data from the operation-related data. In a case where an operation of individual element is identified, for example, the generation method determination unit 230 selects a generation method (may be described as the second generation method) of generating the plurality of target data by converting a plurality of portions of the operation-related data into a waveform on a frequency axis. In a case where an operation that can be measured by the sensor 180 such as vibration is identified, for example, the generation method determination unit 230 selects a generation method (may be described as the third generation method) of generating the plurality of target data by converting the plurality of portions of the operation-related data into a waveform formed by a plurality of modelling parameters.

The characteristics of the operation-related data may be different according to the type of the target operation of the operation-related data. Using a generation method according to the type of the target operation of the operation-related data can contribute to improvement of the accuracy of the abnormality detection.

The generation method determination unit 230 determines said generation method based on the analysis result by the operation-related data, for example. The generation method determination unit 230 may analyze the operation-related data stored in the operation-related data storage unit 204, and determine the generation method for generating the plurality of target data from the operation-related data based on the analysis result. For example, in a case where the operation-related data is periodic, the generation method determination unit 230 selects a first generation method. For example in a case where the operation-related data is not periodic, the generation method determination unit 230 selects a second generation method or a third generation method. In this manner, a generation method that is suitable for the characteristics of the operation-related data can be used, which can contribute to the improvement in the accuracy of abnormality detection.

Generating the Target Data Using a Plurality of Generation Methods

The target data generation unit 210 may generate a plurality of target data from operation-related data by each of the plurality of types of generation method for generating a plurality of target data from the operation-related data. The detection processing execution unit 214 may execute the change detection processing on each of the plurality of target data generated by each of the plurality of types of generation methods.

The target data generation unit 210 generates the plurality of target data by using each of the first generation method, the second generation method, and the third generation method on the operation-related data that is stored in the operation-related data storage unit 204, for example. In addition, the reference data generation unit 208 generates the plurality of reference data by using, for the operation-related data stored in the operation-related data storage unit 204, each of a method of performing an averaging processing on a plurality of portions of the operation-related data, a method of converting the plurality of portions of the operation-related data into a waveform on a frequency axis to perform the averaging processing, and a method of converting the plurality of portions of the operation-related data into a waveform formed by a plurality of modelling parameters to perform the averaging processing.

The linked data generation unit 212 then generates, for each of the plurality of generation methods, linked data obtained by linking the plurality of target data and the reference data, and the detection processing execution unit 214 executes the change detection processing. The abnormality detection unit 218 may detect an abnormality in the movable apparatus 100 based on the result of change detection processing for each of the plurality of generation methods. The abnormality detection unit 218 determines that an abnormality is occurring in the movable apparatus 100 in a case where a change is detected in at least one of the plurality of generation methods, for example. In this manner, with the characteristics or the like of the operation-related data, for example, it is possible to determine that an abnormality is occurring in the movable apparatus 100 even in a case where an abnormality is not detected in any of the plurality of generation methods, despite an abnormality occurring in the movable apparatus 100. It should be noted that, the abnormality detection unit 218 may determine that an abnormality is occurring in the movable apparatus 100 in a case where a change is detected in half or more of the plurality of generation methods, for example. In addition, the abnormality detection unit 218 may determine that an abnormality is occurring in the movable apparatus 100 in a case where a change is detected in all of the plurality of generation methods, for example.

As described above, detection of an abnormality in the movable apparatus 100 by the abnormality detection apparatus 200 is not essential, and the processing executed by the abnormality detection apparatus 200 may only be processing related to detection of an abnormality in the movable apparatus 100. In this case, the abnormality detection apparatus 200 may not include the abnormality detection unit 218, the failure timing estimation unit 220, and the estimating data storage unit 222.

Figure 6:
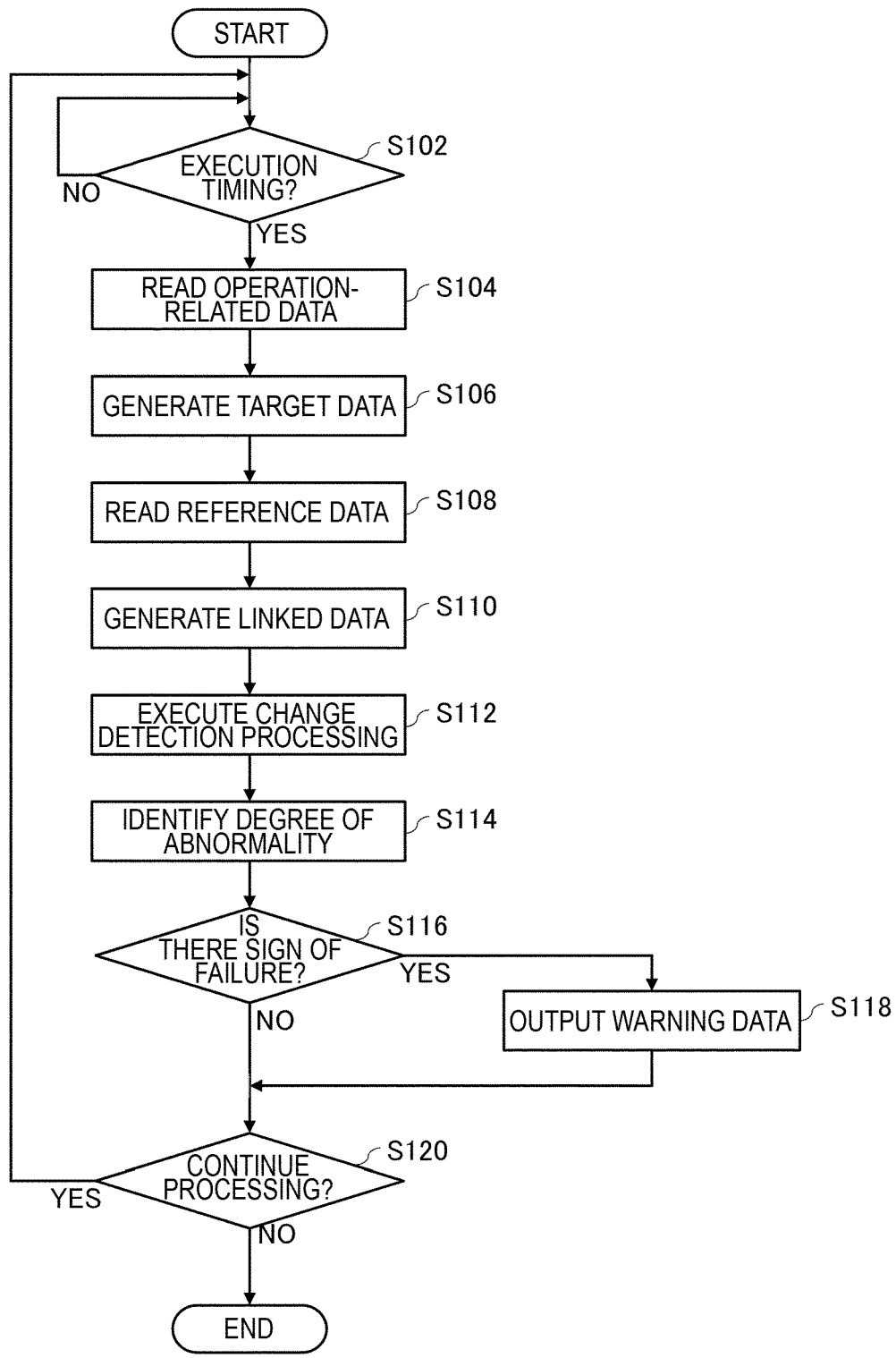
FIG. 6 schematically illustrates one example of a flow of a processing by the abnormality detection apparatus 200.

FIG. 6 schematically illustrates one example of a flow of a processing by the abnormality detection apparatus 200. Here, description will be made assuming a situation in which the reference data is already stored in the reference data storage unit 206, and the abnormality detection apparatus 200 is continuously receiving the operation-related data from the movable apparatus 100.

At step (steps may be described as S in short) 102, the control unit of the abnormality detection apparatus 200 waits to execute the abnormality detection until the execution timing of the abnormality detection arrives. In a case where the abnormality detection apparatus 200 is set to execute the abnormality detection every hour, for example, the abnormality detection apparatus 200 firstly waits until a start time arrives.

At S104, the target data generation unit 210 reads the operation-related data from the operation-related data storage unit 204. The target data generation unit 210 may read the operation-related data between the current time and the time that is earlier than the current time by a predetermined period.

At S106, the target data generation unit 210 generates a plurality of target data based on the operation-related data read at S104. At S108, the linked data generation unit 212 reads the reference data from the reference data storage unit 206. At S110, the linked data generation unit 212 generates linked data obtained by linking the plurality of target data generated at S106 and the reference data read at S108.

At S112, the detection processing execution unit 214 executes a change detection processing on the linked data generated at S110. At S114, the abnormality detection unit 218 identifies the degree of abnormality based on the processing result of the change detection processing at S112.

At S116, the failure timing estimation unit 220 determines whether there is a sign of a failure in the movable apparatus 100 based on the degree of abnormality identified at S114. The failure timing estimation unit 220 determines that there is a sign of a failure in a case where the time series change in the degree of abnormality indicates an exponential change, for example. The failure timing estimation unit 220 may estimate the failure timing by using an exponential model or by using the estimation data.

At S118, the output control unit 216 causes warning data to be output. The warning data may indicate that there is a sign of a failure in the movable apparatus 100. The warning data may include the failure timing estimated by the failure timing estimation unit 220.

At S120, the control unit of the abnormality detection apparatus 200 determines whether to continue the abnormality detection processing. The control unit of the abnormality detection apparatus 200 determines not to continue the processing in a case where an ending instruction by the administrator or the like of the movable apparatus 100 is received, or where a preset execution period of the abnormality detection processing expires, and otherwise determines to continue the processing, for example. In a case where the processing is determined to be continued, the process returns to S102.

Figure 7:
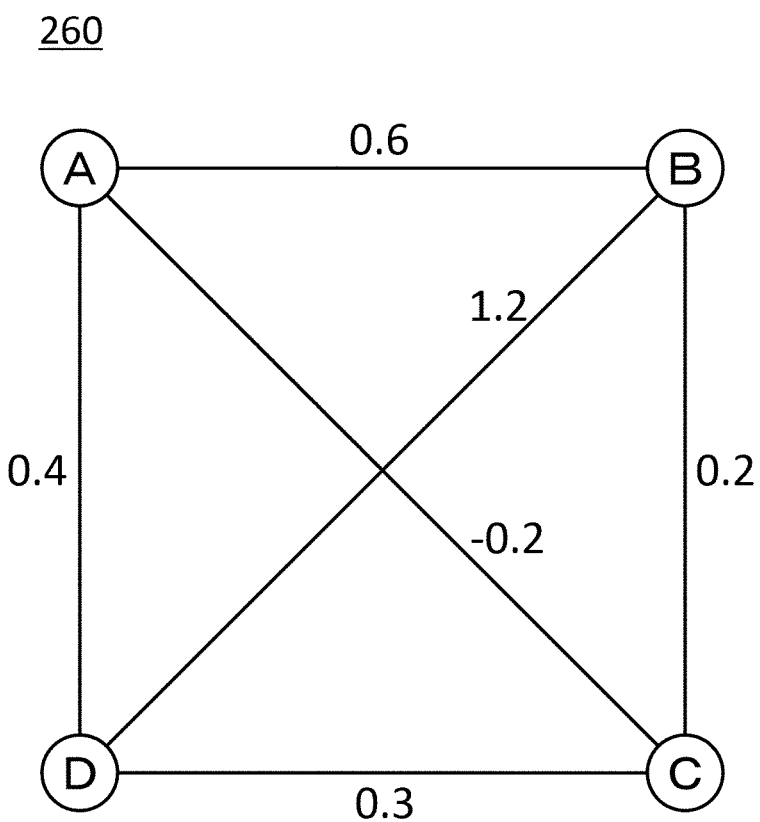
FIG. 7 schematically illustrates one example of a correlation 260 among a plurality of types of operation-related data.

FIG. 7 schematically illustrates one example of a correlation 260 among a plurality of types of operation-related data. The abnormality detection apparatus 200 may receive a plurality of types of operation-related data from the movable apparatus 100, and execute the abnormality detection processing using the correlation among the plurality of types of operation-related data.

The target data generation unit 210 may crop, from the plurality of types of operation-related data, portions resulting from an operation at the same time, and calculate the correlation among each of the portions. The target data generation unit 210 calculates, for example, the correlation among each of the portions by using the portions at the same time cropped from the plurality of types of operation-related data as is. The target data generation unit 210 may calculate the correlation among each of the portions by performing the conversion processing on the portions at the same time cropped from the plurality of types of operation-related data.

FIG. 7 illustrates one example of the correlation among portion Cropped from each of four types of operation-related data. In a case where the control apparatus 106 of the movable apparatus 100 is an inverter, the four types of operation-related data may be, for example, a torque, a q-axis current, a motor speed, and an output current.

In the example illustrated in FIG. 7, the correlation between the portion A and the portion B is 0.6, the correlation between the portion A and the portion C is –0.2, the correlation between the portion A and the portion D is 0.4, the correlation between the portion B and the portion C is 0.2, the correlation between the portion B and the portion D is 1.2, and the correlation between the portion C and the portion D is 0.3. The target data generation unit 210 generates a waveform represented by the plurality of correlations, for example, and uses the same as the target data. The target data generation unit 210 may generate the target data corresponding to a plurality of time in a similar manner.

The reference data generation unit 208 may generate the reference data from a plurality of types of operation-related data. The reference data generation unit 208 calculates the correlation among portions at the same time within a normal operation period 124 for the plurality of types of operation-related data, for example. The reference data generation unit 208 calculates, by using portions at the same time cropped from the plurality of types of operation-related data, the correlation among each of the portions, for example. The reference data generation unit 208 may calculate, by performing the conversion processing on portions at the same time cropped from the plurality of types of operation-related data, the correlation among each of the portions. The reference data generation unit 208 generates a waveform represented by the plurality of correlations, for example, and uses the same as the reference data. The reference data generation unit 208 may crop portions at a plurality of times within the normal operation period 124 for the plurality of types of operation-related data, calculate the correlation for each time, and generate the reference data by performing the averaging processing.

The linked data generation unit 212 generates linked data obtained by linking the plurality of target data generated by the target data generation unit 210 and the reference data generated by the reference data generation unit 208. The detection processing execution unit 214 executes a change detection processing on said linked data. The abnormality detection unit 218 identifies the degree of abnormality based on the processing result of said change detection processing. The failure timing estimation unit 220 estimates the failure timing of the movable apparatus 100 based on the time series change in the degree of abnormality.

While the movable apparatus 100 is operating normally, the probability is high that the correlation among the plurality of types of operation-related data does not change. On the other hand, by the time a sign of failure can be seen in the movable apparatus 100, the probability is high that the correlation among the plurality of types of operation-related data changes due to the individual change in each of the plurality of types of operation-related data. Therefore, by using the correlation among a plurality of types of operation-related data, an abnormality in the movable apparatus 100 or a failure in the movable apparatus 100 may be estimated with a relatively high accuracy.

Figure 8:
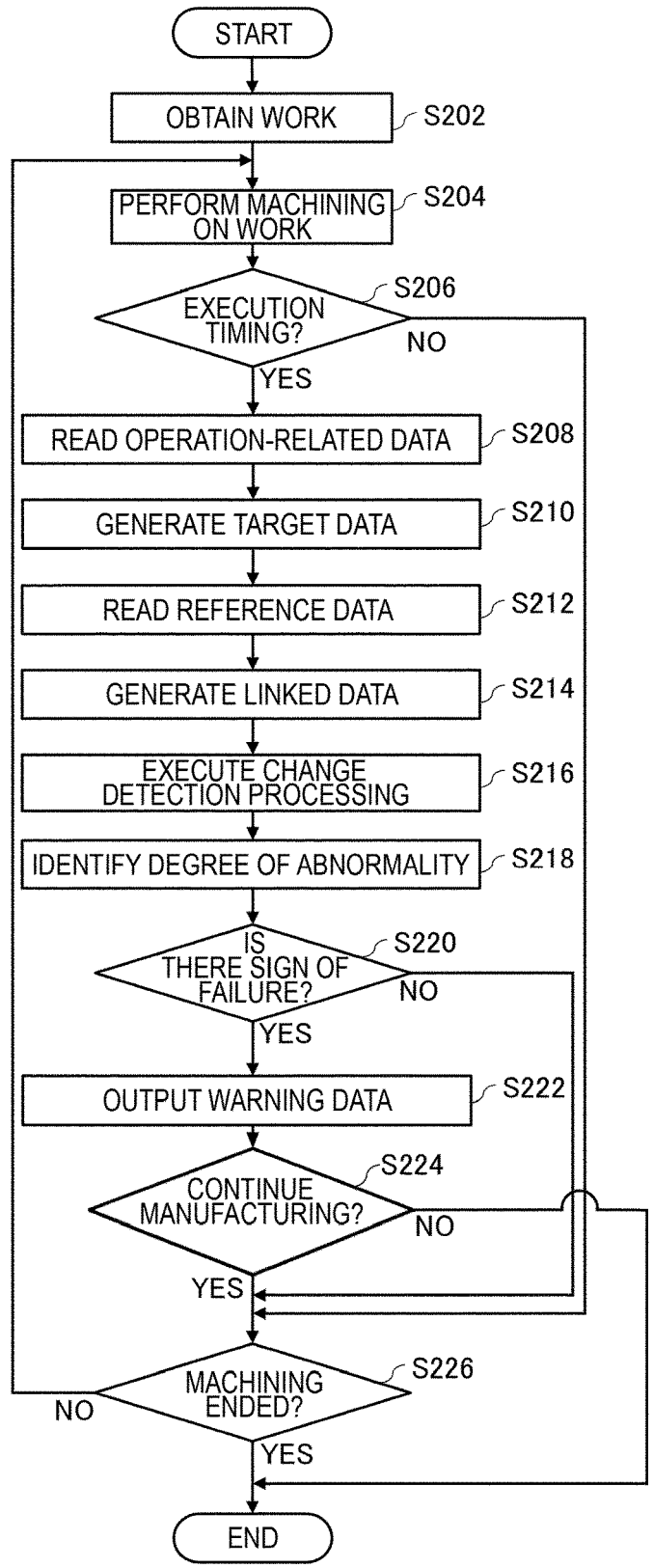
FIG. 8 schematically illustrates one example of a flow of a method for manufacturing a manufacture item by the system 10.

FIG. 8 schematically illustrates one example of a flow of a method for manufacturing a manufacture item by the system 10. The system 10 may manufacture the manufacture item by performing machining on a work. For example, the movable apparatus 100 includes a robot arm as the movable part, and performs any operation such as machining, assembling and the like on the work with the robot arm.

At S202, the movable apparatus 100 obtains the work that is the machining target. In a case where there is a plurality of work that is the machining target, the movable apparatus 100 obtains a plurality of work. At S204, the movable apparatus 100 performs machining on the work obtained at S202.

At S206, the control unit of the abnormality detection apparatus 200 determines whether execution timing of abnormality detection has arrived. In a case where it is determined that the execution timing has arrived, the process proceeds to S208, and in a case where it is determined that the execution timing has not arrived, the process proceed to S226.

S208 to S218 may be similar to S104 to S114. At S220, the failure timing estimation unit 220 determines whether there is a sign of a failure in the movable apparatus 100 based on the degree of abnormality identified at S218. The failure timing estimation unit 220 determines that there is a sign of a failure in a case where the time series change in the degree of abnormality indicates an exponential change, for example. The failure timing estimation unit 220 may estimate the failure timing by using an exponential model or by using the estimation data. In a case where it is determined that there is a sign of a failure, the process proceeds to S222, and in a case where it is determined that there is no sign of a failure, the process proceeds to S226.

At S222, the output control unit 216 causes warning data to be output. The warning data may indicate that there is a sign of a failure in the movable apparatus 100. The warning data may include the failure timing estimated by the failure timing estimation unit 220.

At S224, the control unit of the abnormality detection apparatus 200 determines whether to continue the manufacturing by the movable apparatus 100. The abnormality detection apparatus 200 may determine whether to continue the manufacturing according to an instruction by the administrator or the like of the movable apparatus 100. In a case where it is determined to continue the manufacturing, the process proceeds to S226, and, in a case where it is determined not to continue the manufacturing, the manufacturing processing ends.

At S226, the movable apparatus 100 determines whether the machining of the work has ended. In a case where a plurality of works is obtained at S202, the movable apparatus 100 determines whether the machining has ended for all of the plurality of works. The manufacturing of the manufacture item is completed with the end of the machining. In a case where it is determined that the machining has not ended, the process returns to S204, and in a case where it is determined that the machining has ended, the processing ends.

Figure 9:
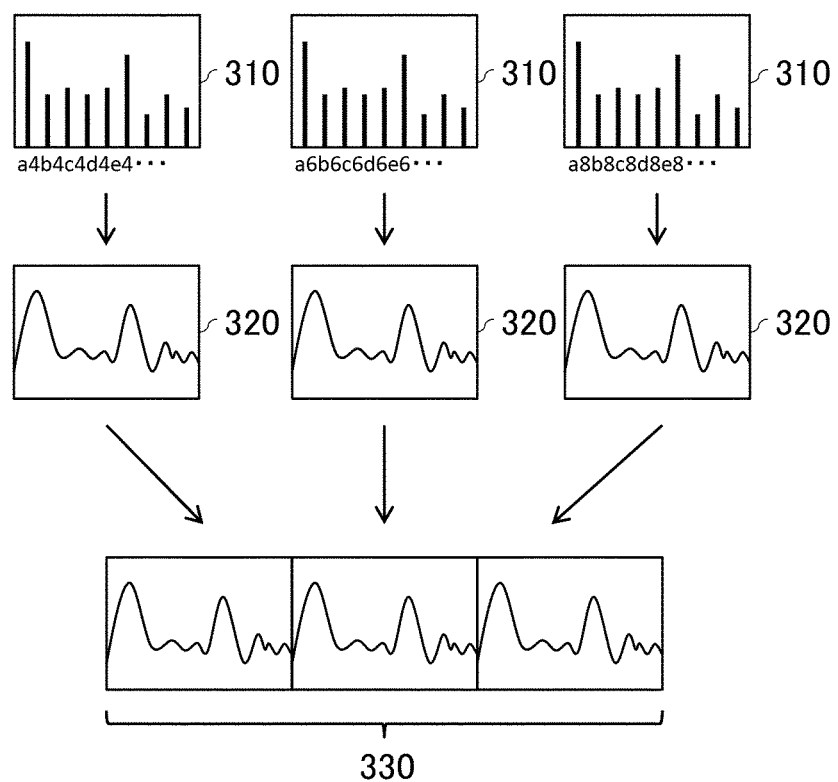
FIG. 9 schematically illustrates one example of operation-related data 300.

FIG. 9 schematically illustrates one example of operation-related data 300. As described above, the operation-related data 300 may be a measurement value at the movable apparatus 100, an instruction value at the movable apparatus 100, a plurality of types of setting value inside the movable apparatus 100, information used for feedback control in the movable apparatus 100, data indicating the inspection result of the inspection of the movable apparatus 100, data related to the manufacture item manufactured by the operation of the movable apparatus 100, a value output by the sensor 180, and the like. That is, the operation-related data 300 may be a value of any of a plurality of types of parameter obtained on a regular or irregular basis.

The operation-related data 300 illustrated in FIG. 9 includes a value of a plurality of types of parameter obtained on a regular or irregular basis. The target data generation unit 210 may generate a plurality of target data 320 that are temporally separated by performing a conversion processing on portions 310 of the operation-related data 300 that are temporally separated to convert the same into waveform data. Although a case where three pieces of target data 320 is generated is illustrated in FIG. 9, the number of the target data 320 is not limited to this, and may be four or more.

The linked data generation unit 212 generates linked data 330 obtained by linking a plurality of target data 320. The detection processing execution unit 214 executes a change detection processing on the linked data 330.

As shown in FIG. 2 and FIG. 9, according to the abnormality detection apparatus 200, a plurality of target data 320 is generated from portions 310 of the operation-related data 300 that are temporally separated, and the change detection processing is executed on the linked data 330 obtained by linking the plurality of target data 320. In this manner, a change can be detected even if an abnormality that occurred in the movable apparatus 100 has an impact on any portion of any of the target data 320, among the plurality of target data 320, for example.

It may be possible to realize such change detection by performing a change detection processing on the entire operation-related data 300 without generating, from portions 310 of the operation-related data 300 that are temporally separated, the plurality of target data 320 that are temporally separated and linking the same. However, as time elapses, the data amount of the operation-related data 300 increases, and the computational cost increases, as well as the loads for preserving data increase. In comparison, according to the abnormality detection apparatus 200, change detection can be perform with data of the same length every time on newly obtained operation-related data 300, and in such a case, the computational cost and the loads for preserving data can be significantly reduced.

In addition, according to the abnormality detection apparatus 200, a long-term abnormality detection can be realized without increasing the computational cost by adjusting the time interval of the target portions 310 of the operation-related data 300. For example, in a case where a hundred pieces of data per cycle that is performed once every day is to be obtained as the operation-related data 300, when data from today (assuming Monday) to five days ago is linked, linked data 330 having a length of 600 is obtained. By changing this to five weeks ago and picking data every Monday to be linked, linked data 330 having a length of 600 is obtained. In this way, by thinning and linking long-term data, a range for detecting an abnormality can be enlarged without increasing the computational cost, and it may become possible to comprehend the trend in the abnormality that may be hidden in a short-term.

Furthermore, similarly to what is illustrated in FIG. 3, the reference data generation unit 208 may generate the reference data based on a portion of the operation-related data 300, and the linked data generation unit 212 may generate linked data 330 obtained by linking said reference data and the plurality of target data 320 generated by the target data generation unit 210.

As described above, the sensor 180 may be an image capture sensor, and the operation-related data 300 may be an image. The operation-related data 300 may be a moving image. The operation-related data 300 may be a still image captured on a regular or irregular basis. The operation-related data 300 may be a moving image capturing the entire movable apparatus 100, for example. The operation-related data 300 may be a still image capturing the entire movable apparatus 100 on a regular or irregular basis. The operation-related data 300 may be a moving image capturing a portion of the movable apparatus 100. The operation-related data 300 may be a still image capturing a portion of the movable apparatus 100 on a regular or irregular basis.

In a case where the operation-related data 300 is a moving image, the target data generation unit 210 may generate a plurality of target data 320 that are temporally separated by performing a conversion processing on portions 310 of the operation-related data 300 that are temporally separated, i.e. the frames, to convert the same into waveform data. In a case where the operation-related data 300 is a still image captured on a regular or irregular basis, the target data generation unit 210 may generate a plurality of target data 320 that are temporally separated by performing a conversion processing on portions 310 of the operation-related data 300 that are temporally separated, i.e. the plurality of still images, to convert the same into waveform data.

The communication unit 202 in the above embodiment may be one example of communication means for communicating with the communication unit 108 and the sensor 180. The operation-related data storage unit 204 in the above embodiment may be one example of storage means for storing the operation-related data received by the communication unit 202. The reference data storage unit 206 in the above embodiment may be one example of reference data storage means for storing the reference data. The reference data generation unit 208 in the above embodiment may be one example of reference data generation means for generating the reference data. The target data generation unit 210 in the above embodiment may be one example of target data generation means for generating the target data. The linked data generation unit 212 in the above embodiment may be one example of linked data generation means for generating the linked data. The detection processing execution unit 214 in the above embodiment may be one example of detection processing execution means for executing the change detection processing. The output control unit 216 in the above embodiment may be one example of output control means for controlling the output of the output data generated based on the processing result of the detection processing execution unit 214. The abnormality detection unit 218 in the above embodiment may be one example of abnormality detection means for detecting an abnormality in the movable apparatus 100 based on a temporal change in the processing result of the change detection processing by the detection processing execution unit 214. The failure timing estimation unit 220 in the above embodiment may be one example of failure timing estimation means for estimating the failure timing of the movable apparatus 100 based on the time series change in the degree of abnormality determined by the abnormality detection unit 218. The estimating data storage unit 222 in the above embodiment may be one example of estimation data storage means for storing the estimation data. The reference data selection unit 224 in the above embodiment may be one example of reference data selection means. The setting reception unit 226 in the above embodiment may be one example of setting reception means for receiving the setting of the abnormality detection mode. The movable apparatus control unit 228 in the above embodiment may be one example of movable apparatus control means for controlling the movable apparatus 100. The generation method determination unit 230 in the above embodiment may be one example of generation method determination means for determining the generation method of generating the plurality of target data from the operation-related data.

Figure 10:
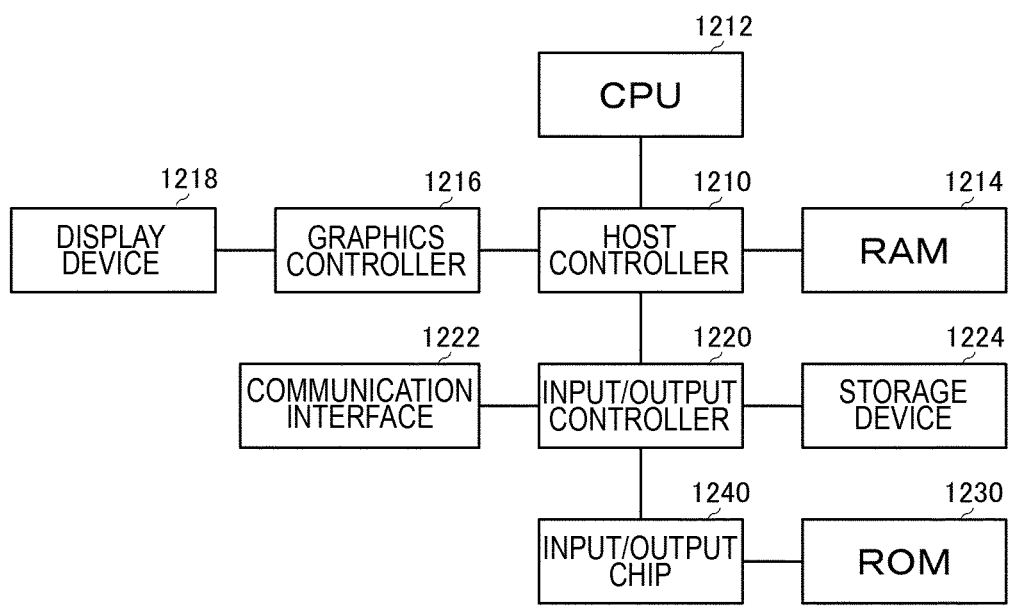
FIG. 10 schematically illustrates one example of a hardware configuration of a computer 1200 that functions as the abnormality detection apparatus 200.

FIG. 10 schematically illustrates one example of a hardware configuration of a computer 1200 that functions as the abnormality detection apparatus 200. A program installed in the computer 1200 can cause the computer 1200 to function as one or more "units" of an apparatus according to the present embodiment, or cause the computer 1200 to perform operations associated with the apparatus or perform one or more "units" thereof according to the present embodiment, and/or cause the computer 1200 to perform the process according to the present embodiment or perform the steps of the process. Such a program may be executed by a CPU 1212 to cause the computer 1200 to perform specific operations associated with some or all of the blocks in the flow charts and block diagrams described in the specification.

The computer 1200 according to the present embodiment includes a CPU 1212, a RAM 1214, and a graphics controller 1216, which are connected to each other via a host controller 1210. The computer 1200 also includes input/output units such as a communication interface 1222, a storage device 1224, a DVD drive and an IC card drive, which are connected to the host controller 1210 via an input/output controller 1220. The DVD drive may be a DVD-ROM drive, a DVD-RAM drive, and the like. The storage device 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated, by the CPU 1212, in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The DVD drive reads the programs or the data from the DVD-ROM or the like, and provides the storage device 1224 with the programs or the data. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port or the like to the input/output controller 1220.

A program is provided by a computer-readable storage medium such as the DVD-ROM or the IC card. The program is read from the computer-readable storage medium, installed into the storage device 1224, RAM 1214, or ROM 1230, which are also examples of a computer-readable storage medium, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, information processing, condition judging, conditional branch, unconditional branch, search/replacement of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry whose attribute value of the first attribute matches the condition a designated condition, from among the plurality of entries, and read the attribute value of the second attribute stored in the entry, thereby obtaining the attribute value of the second attribute associated with the first attribute satisfying the predetermined condition.

The above described program or software modules may be stored in the computer-readable storage medium on or near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flow charts and block diagrams in the present embodiments may represent steps of processes in which operations are performed or "units" of apparatuses responsible for performing operations. Certain steps and "units" may be implemented by dedicated circuitry, programmable circuitry supplied with computer-readable instructions stored on a computer-readable storage medium, and/or processors supplied with computer-readable instructions stored on a computer-readable storage medium. Dedicated circuitry may include digital and/or analog hardware circuits and may include integrated circuits (IC) and/or discrete circuits. For example, programmable circuitry may include reconfigurable hardware circuits including logical AND, OR, XOR, NAND, NOR, and other logical operations, flip-flops, registers, and memory elements, such as field-programmable gate arrays (FPGA), programmable logic arrays (PLA), etc.

A computer-readable storage medium may include any tangible device that can store instructions for execution by a suitable device, such that the computer-readable storage medium having instructions stored therein comprises an article of manufacture including instructions which can be executed to create means for performing operations specified in the flow charts or block diagrams. Examples of the computer-readable storage medium may include an electronic storage medium, a magnetic storage medium, an optical storage medium, an electromagnetic storage medium, a semiconductor storage medium, etc. More specific examples of the computer-readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general-purpose computer, a special-purpose computer, or other programmable data processing apparatus, or to programmable circuitry, locally or via a local area network (LAN), wide area network (WAN) such as the Internet, etc., so that the processor of the general-purpose computer, special-purpose computer, or other programmable data processing apparatus, or the programmable circuitry executes the computer-readable instructions to create means for performing operations specified in the flow charts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system, 100: movable apparatus, 102: movable part, 104: motor, 106: control apparatus, 108: communication unit, 122: period, 124: normal operation period, 180: sensor, 200: abnormality detection apparatus, 202: communication unit, 204: operation-related data storage unit, 206: reference data storage unit, 208: reference data generation unit, 210: target data generation unit, 212: linked data generation unit, 214: detection processing execution unit, 216: output control unit, 218: abnormality detection unit, 220: failure timing estimation unit, 222: estimating data storage unit, 224: reference data selection unit, 226: setting reception unit, 228: movable apparatus control unit, 230: generation method determination unit, 240: display unit, 260: correlation, 280: abnormality degree transition graph, 300: operation-related data, 310: portion, 320: target data, 330: linked data, 340: intermediate data, 342: reference data, 350: change detection result, 1200: computer, 1210: host controller, 1212: CPU, 1214: RAM, 1216: graphics controller, 1218: display device, 1220: input/output controller, 1222: communication interface, 1224: storage device, 1230: ROM, 1240: input/output chip

What is claimed is:

1. An abnormality detection apparatus for detecting an abnormality in a movable apparatus including an operating part and capable of performing at least one task of machining or assembling performed on one or more works using the operating part, the abnormality detection apparatus comprising:
one or more processors supplied with computer-readable instructions stored on one or more non-transitory computer-readable storage media such that when the computer-readable instructions are executed by the one or more processors, the abnormality detection apparatus functions as a plurality of units comprising:
a communication unit configured to at least receive operation-related data from the movable apparatus or from a sensor, the operation-related data resulting from an operation of the operating part of the movable apparatus;

a target data generation unit configured to generate, based on the operation-related data, a plurality of target data, each of the plurality of target data being target data that includes a plurality of values, the operation-related data including data in a time series resulting from the operation of the operating part when the at least one task is performed on the one or more works, each of the plurality of target data corresponding to one of a plurality of portions of the operation-related data, each of the plurality of portions of the operation-related data containing data resulting from the same operation of the operating part performed at a different corresponding time, the plurality of portions of the operation-related data being temporally separated from each other such that each of the plurality of portions of the operation-related data is separated from a succeeding one of the plurality of portions of the operation-related data by a corresponding time interval, and the corresponding time interval being greater than a time interval between pairs of consecutive data in the time series of each of the plurality of portions of the operation-related data;

a linked data generation unit configured to generate linked data that includes data obtained by linking the plurality of target data in a series, wherein the plurality of target data are linked in the series such that each of the plurality of target data in the series, except for a first one of the plurality of target data in the series, immediately follows another of the plurality of target data in the series in sequential order, to provide at least a portion of the linked data, wherein each of the plurality of target data has a wave form, a first end, and a second end, and wherein each of the plurality of target data in the series, except for the first one of the plurality of target data in the series, is appended to a preceding one of the plurality of target data in the series in end-to-end fashion such that the first end of each of the plurality of target data in the series, except for the first one of the plurality of target data in the series, is appended to the second end of the preceding one of the plurality of target data in the series;

a detection processing execution unit configured to execute change detection processing on the linked data;

an abnormality detection unit;

a reference data storage unit configured to store in advance reference data, the linked data generation unit being configured to generate the linked data such that the linked data includes data obtained by linking the plurality of target data in the series and the reference data; and a reference data generation unit configured to generate the reference data based on a plurality of portions of the operation-related data corresponding to the reference data that are earlier in time compared to the plurality of portions of the operation-related data corresponding to the plurality of target data, and to cause the reference data to be stored in the reference data storage unit, wherein each of the plurality of portions of the operation-related data corresponding to the reference data and each of the plurality of portions of the operation-related data corresponding to the plurality of target data comprises a corresponding wave form having a plurality of values, the plurality of portions of the operation-related data corresponding to the reference data are temporally separated from each other such that each of the plurality of portions of the operation-related data corresponding to the reference data is separated from a succeeding one of the plurality of portions of the operation-related data corresponding to the reference data by a corresponding time interval, the linked data generation unit is configured to generate the linked data by including the reference data and linking the reference data in series with the plurality of target data that are linked in series in the linked data that is generated, the plurality of the portions of the operation-related data corresponding to the plurality of target data are later than the plurality of portions of the operation-related data corresponding to the reference data, the detection processing execution unit is configured to execute change detection processing on the linked data to generate a change detection result waveform, the change detection processing is performed by applying a moving window of change detection processing to a portion the linked data corresponding to the reference data and a portion of the linked data corresponding to at least recent data of the plurality of the target data, and by comparing their results, the abnormality detection unit is configured to determine a degree of abnormality by using a calculated numerical value as the degree of abnormality, the calculated numerical value is selected from the group consisting of a maximum value of the change detection result waveform, an average value of the change detection result waveform, and a standard deviation of the change detection result waveform; and the abnormality detection apparatus is configured to, based on the change detection result waveform, provide instructions to continue the performing of the at least one task of machining or assembling, or provide instructions not to continue the performing of the at least one task of machining or assembling.

2. The abnormality detection apparatus according to claim 1, wherein the abnormality detection unit is configured to detect an abnormality of the movable apparatus based on a temporal change in a processing result of the change detection processing, the abnormality detection apparatus further comprising:

an output control unit configured to control an output of output data generated based on a processing result by the change detection processing, wherein the output control unit controls the output of the output data to effect notifying that there is a possibility of the abnormality occurring in the movable apparatus in a case where the abnormality in the movable apparatus is detected by the abnormality detection unit.

3. The abnormality detection apparatus according to claim 1, wherein the target data generation unit generates each of the plurality of target data by performing conversion processing on a corresponding one of a plurality of portions of the operation-related data, each of the plurality of target data is formed by the entirety of the result of the application of the conversion process to the corresponding one of the plurality of portions of the operation-related data.

4. The abnormality detection apparatus according to claim 1, wherein the reference data generation unit is configured to perform averaging processing on a plurality of intermediate data generated based on the operation-related data to generate the reference data, and cause the reference data to be stored in the reference data storage unit.

5. The abnormality detection apparatus according to claim 1, wherein
the reference data generation unit is configured to generate the reference data based on a portion of the operation-related data resulting from an operation of the movable apparatus during a normal operation period after an operation of the movable apparatus has become stable, after the movable apparatus is introduced, after an accumulated operation period of the movable apparatus becomes longer than a predetermined period, or after a number of times of an accumulated operation of the movable apparatus becomes greater than a predetermined number of times.

6. The abnormality detection apparatus according to claim 1, wherein
the reference data generation unit is configured to generate the reference data based on a portion of the operation-related data resulting from an operation in accordance with a first operation pattern by the movable apparatus,
the abnormality detection apparatus further comprising a movable apparatus control unit configured to cause the movable apparatus to execute a second operation pattern that is identical to or similar to the first operation pattern, wherein
the detection processing execution unit is configured to execute the change detection processing with the reference data included in the plurality of target data generated based on the operation-related data while an operation in accordance with the second operation pattern is being executed by the movable apparatus.

7. The abnormality detection apparatus according to claim 1, wherein
the reference data storage unit is configured to store the reference data for each operating mode of the movable apparatus,
the abnormality detection apparatus further comprising a reference data selection unit configured to select the reference data according to an operating mode of the movable apparatus, wherein
the detection processing execution unit is configured to execute, with the reference data selected by the reference data selection unit in the plurality of target data generated by the target data generation unit, the change detection processing on the plurality of target data.

8. The abnormality detection apparatus according to claim 1, wherein
the target data generation unit is configured to generate the plurality of target data obtained by converting the plurality of portions of the operation-related data into a waveform on an axis that is different from a time.

9. The abnormality detection apparatus according to claim 8, wherein
the target data generation unit is configured to generate the plurality of target data obtained by converting the plurality of portions of the operation-related data into a waveform on a frequency axis.

10. The abnormality detection apparatus according to claim 8, wherein
the target data generation unit is configured to generate the plurality of target data obtained by converting the plurality of portions of the operation-related data into a waveform formed by a plurality of modelling parameters.

11. The abnormality detection apparatus according to claim 1, wherein
the target data generation unit is configured to update, for the operation-related data to be updated, at least one target data of the plurality of target data, and
the detection processing execution unit is configured to execute change detection processing on the plurality of updated target data each time the update is performed.

12. The abnormality detection apparatus according to claim 11, wherein
the abnormality detection unit is configured to detect abnormality of the movable apparatus based on a temporal change in a processing result of the change detection processing.

13. The abnormality detection apparatus according to claim 12, wherein
the abnormality detection unit is configured to determine a degree of abnormality based on a processing result of each of the change detection processing,
the abnormality detection apparatus further comprising a failure timing estimation unit configured to estimate failure timing of the movable apparatus based on a time series change in the degree of abnormality.

14. The abnormality detection apparatus according to claim 13, wherein
the failure timing estimation unit is configured to estimate the failure timing of the movable apparatus based on a time series change in the degree of abnormality, and a time series change in the degree of abnormality in other movable apparatuses of a same type as the movable apparatus and timing of failure of the other movable apparatuses.

15. The abnormality detection apparatus according to claim 1, further comprising:
a generation method determination unit configured to determine a generation method for generating the plurality of target data from the operation-related data based on a type of a target operation of the operation-related data or an analysis result of the operation-related data, wherein
the target data generation unit is configured to generate the plurality of target data based on the operation-related data with the generation method determined by the generation method determination unit.

16. The abnormality detection apparatus according to claim 1, wherein the detection processing execution unit is configured to execute change detection processing on the linked data by an algorithm selected from the group consisting of matrix profiling, an autoregressive model, a state space model, and a K-nearest neighbors algorithm, to generate a change detection result waveform.

17. The abnormality detection apparatus according to claim 1, wherein the target data generation unit is configured to periodically update at least one of the plurality of target data, but less than all the plurality of the target data, to generate an updated plurality of target data based on an updated plurality of portions of the operation-related data having a corresponding number of the portions of the operation-related data that are updated, each of the updated plurality of target data being target data that includes a plurality of values, and each of the updated plurality of target data corresponding to one of the updated plurality of portions of the operation-related data, the updated plurality of portions of the operation-related data being temporally separated from each other such that each of the updated plurality of portions of the operation-related data is separated from a succeeding one of the updated plurality of portions of the operation-related data by a corresponding time interval, the linked data generation unit is configured to periodically generate updated linked data that includes data obtained by linking the updated plurality of target data in a series, wherein the updated plurality of target data are linked in the series such that each of the updated plurality of target data in the series, except for a first one of the updated plurality of target data in the series, immediately follows another of the updated plurality of target data in the series in sequential order, to provide at least a portion of the updated linked data, and the detection processing execution unit is configured to periodically execute change detection processing on the updated linked data each time an updated linked data is generated.

18. The abnormality detection apparatus according to claim 1, wherein the abnormality detection unit detects the abnormality in the movable apparatus based on a change in a time series of the degree of abnormality by performing one of an outlier detection, an abnormality region detection, and a change point detection on the time series of the degree of abnormality, and determines that some abnormality is occurring in the movable apparatus when one of an outlier, an abnormality region, and a change point, respectively, is detected.

19. The abnormality detection apparatus according to claim 18, further comprising a failure timing estimation unit, wherein the failure timing estimation unit is configured to estimate the failure timing of the movable apparatus based on a prediction result of the change in the time series of the degree of abnormality, wherein the failure timing detection unit is configured to identify, as an estimated failure timing, a time at which the prediction result of the change in the time series of the degree of abnormality exceeds a threshold value, wherein the output control unit notifies an administrator of the movable apparatus of the estimated failure timing, wherein the failure timing estimation unit is configured to predict the change in the degree of abnormality at future times by applying a predetermined exponential model to a transition in the time series of the degree of abnormality where an exponential change is indicated by the time series of the degree of abnormality.

20. A non-transitory computer-readable storage medium having stored thereon a program that, when executed by an apparatus comprising one or more processors, causes the apparatus to function as an abnormality detection apparatus for detecting an abnormality in a movable apparatus including an operating part and capable of performing at least one task of machining or assembling performed on one or more works using the operating part, the abnormality detection apparatus comprising:

a communication unit configured to at least receive operation-related data from the movable apparatus or from a sensor, the operation-related data resulting from an operation of the operating part of the movable apparatus;

a target data generation unit configured to generate, based on the operation-related data, a plurality of target data, each of the plurality of target data being target data that includes a plurality of values, the operation-related data including data in a time series resulting from the operation of the operating part when the at least one task is performed on the one or more works, each of the plurality of target data corresponding to one of a plurality of portions of the operation-related data, each of the plurality of portions of the operation-related data containing data resulting from the same operation of the operating part performed at a different corresponding time, the plurality of portions of the operation-related data being temporally separated from each other such that each of the plurality of portions of the operation-related data is separated from a succeeding one of the plurality of portions of the operation-related data by a corresponding time interval, and the corresponding time interval being greater than a time interval between pairs of consecutive data in the time series of each of the plurality of portions of the operation-related data;

a linked data generation unit configured to generate linked data that includes data obtained by linking the plurality of target data in a series, wherein the plurality of target data are linked in the series such that each of the plurality of target data in the series, except for a first one of the plurality of target data in the series, immediately follows another of the plurality of target data in the series in sequential order, to provide at least a portion of the linked data, wherein each of the plurality of target data has a wave form, a first end, and a second end, and wherein each of the plurality of target data in the series, except for the first one of the plurality of target data in the series, is appended to a preceding one of the plurality of target data in the series in end-to-end fashion such that the first end of each of the plurality of target data in the series, except for the first one of the plurality of target data in the series, is appended to the second end of the preceding one of the plurality of target data in the series;

a detection processing execution unit configured to execute change detection processing on the linked data;

an abnormality detection unit;

a reference data storage unit configured to store in advance reference data, the linked data generation unit being configured to generate the linked data such that the linked data includes data obtained by linking the plurality of target data in the series and the reference data; and a reference data generation unit configured to generate the reference data based on a plurality of portions of the operation-related data corresponding to the reference data that are earlier in time compared to the plurality of portions of the operation-related data corresponding to the plurality of target data, and to cause the reference data to be stored in the reference data storage unit, wherein each of the plurality of portions of the operation-related data corresponding to the reference data and each of the plurality of portions of the operation-related data corresponding to the plurality of target data comprises a corresponding wave form having a plurality of values, the plurality of portions of the operation-related data corresponding to the reference data are temporally separated from each other such that each of the plurality of portions of the operation-related data corresponding to the reference data is separated from a succeeding one of the plurality of portions of the operation-related data corresponding to the reference data by a corresponding time interval, the linked data generation unit is configured to generate the linked data by including the reference data and linking the reference data in series with the plurality of target data that are linked in series in the linked data that is generated, the plurality of the portions of the operation-related data corresponding to the plurality of target data are later than the plurality of portions of the operation-related data corresponding to the reference data, the detection processing execution unit is configured to execute change detection processing on the linked data to generate a change detection result waveform, the change detection processing is performed by applying a moving window of change detection processing to a portion the linked data corresponding to the reference data and a portion of the linked data corresponding to at least recent data of the plurality of the target data, and by comparing their results, the abnormality detection unit is configured to determine a degree of abnormality by using a calculated numerical value as the degree of abnormality, the calculated numerical value is selected from the group consisting of a maximum value of the change detection result waveform, an average value of the change detection result waveform, and a standard deviation of the change detection result waveform; and the abnormality detection apparatus is configured to, based on the change detection result waveform, provide instructions to continue the performing of the at least one task of machining or assembling, or provide instructions not to continue the performing of the at least one task of machining or assembling.

21. An abnormality detection method that is executed by an apparatus comprising one or more processors for detecting an abnormality in a movable apparatus including an operating part and capable of performing at least one task of machining or assembling performed on one or more works using the operating part, the method comprising:

receiving operation-related data from the movable apparatus or from a sensor, the operation-related data resulting from an operation of the operating part of the movable apparatus generating, based on the operation-related data, a plurality of target data, each of the plurality of target data being target data that includes a plurality of values, the operation-related data including data in a time series resulting from the operation of the operating part when the at least one task is performed on the one or more works, each of the plurality of target data corresponding to one of a plurality of portions of the operation-related data, each of the plurality of portions of the operation-related data containing data resulting from the same operation of the operating part performed at a different corresponding time, the plurality of portions of the operation-related data being temporally separated from each other such that each of the plurality of portions of the operation-related data is separated from a succeeding one of the plurality of portions of the operation-related data by a corresponding time interval, and the corresponding time interval being greater than a time interval between pairs of consecutive data in the time series of each of the plurality of portions of the operation-related data;

generating linked data that includes data obtained by linking the plurality of target data in a series, wherein the plurality of target data are linked in the series such that each of the plurality of target data in the series, except for a first one of the plurality of target data in the series, immediately follows another of the plurality of target data in the series in sequential order, to provide at least a portion of the linked data, wherein the plurality of target data are linked in the series such that each of the plurality of target data in the series, except for a first one of the plurality of target data in the series, immediately follows another of the plurality of target data in the series in sequential order, to provide at least a portion of the linked data, wherein each of the plurality of target data has a wave form, a first end, and a second end, and wherein each of the plurality of target data in the series, except for the first one of the plurality of target data in the series, is appended to a preceding one of the plurality of target data in the series in end-to-end fashion such that the first end of each of the plurality of target data in the series, except for the first one of the plurality of target data in the series, is appended to the second end of the preceding one of the plurality of target data in the series;

executing a change detection processing on the linked data;

generating reference data based on a plurality of portions of the operation-related data corresponding to the reference data that are earlier in time compared to the plurality of portions of the operation-related data corresponding to the plurality of target data;

storing the reference data, wherein each of the plurality of portions of the operation-related data corresponding to the reference data and each of the plurality of portions of the operation-related data corresponding to the plurality of target data comprises a corresponding wave form having a plurality of values, the plurality of portions of the operation-related data corresponding to the reference data are temporally separated from each other such that each of the plurality of portions of the operation-related data corresponding to the reference data is separated from a succeeding one of the plurality of portions of the operation-related data corresponding to the reference data by a corresponding time interval, generating linked data comprises generating the linked data such that the linked data includes data obtained by linking the plurality of target data in the series and the reference data, generating linked data further comprises generating the linked data by including the reference data and linking the reference data in series with the plurality of target data that are linked in series in the linked data that is generated, wherein the plurality of the portions of the operation-related data corresponding to the plurality of target data are later than the plurality of portions of the operation-related data corresponding to the reference data, wherein the change detection processing is performed by applying a moving window of change detection processing to a portion the linked data corresponding to the reference data and a portion of the linked data corresponding to at least recent data of the plurality of the target data, and by comparing their results;

determining a degree of abnormality by using a calculated numerical value as the degree of abnormality, wherein the calculated numerical value is selected from the group consisting of a maximum value of the change detection result waveform, an average value of the change detection result waveform, and a standard deviation of the change detection result waveform; and based on the change detection result waveform, providing instructions to continue the performing of the at least one task of machining or assembling, or providing instructions not to continue the performing of the at least one task of machining or assembling.

\* \* \* \* \*